US007222967B2

(12) United States Patent
Okuyama et al.

(10) Patent No.: US 7,222,967 B2
(45) Date of Patent: May 29, 2007

(54) IMAGE DISPLAY OPTICAL SYSTEM AND PROJECTION TYPE IMAGE DISPLAY APPARATUS

(75) Inventors: Atsushi Okuyama, Saitama (JP); Hiroyuki Kodama, Tochiqi (JP); Masayuki Abe, Tochiqi (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 10/213,719

(22) Filed: Aug. 7, 2002

(65) Prior Publication Data

US 2003/0071976 A1 Apr. 17, 2003

(30) Foreign Application Priority Data

Aug. 10, 2001 (JP) ....................................... 2001-244912
Aug. 10, 2001 (JP) ....................................... 2001-244914
Oct. 11, 2001 (JP) ....................................... 2001-314329

(51) Int. Cl.
*G03B 21/00* (2006.01)
*G03B 21/14* (2006.01)
*G03B 21/28* (2006.01)

(52) U.S. Cl. ............................ 353/31; 353/33; 353/38; 353/81

(58) Field of Classification Search ................... 353/31, 353/33, 38, 81
See application file for complete search history.

(56) References Cited

U.S. PATENT DOCUMENTS 4,969,730 A 11/1990 van den Brandt ............. 353/31
5,658,060 A * 8/1997 Dove .......................... 353/33
6,052,231 A * 4/2000 Rosenbluth ................. 359/636
6,250,762 B1 * 6/2001 Kuijper ....................... 353/20
6,398,364 B1 * 6/2002 Bryars ......................... 353/31
6,404,558 B1 * 6/2002 Chuang et al. ............. 359/634
6,450,645 B1 9/2002 Jeon ............................ 353/20
6,561,652 B1 * 5/2003 Kwok et al. .................. 353/31
6,590,714 B2 * 7/2003 Sugawara ................... 359/634
6,601,957 B2 * 8/2003 Sugawara ..................... 353/31
6,623,123 B2 * 9/2003 Eguchi et al. ................ 353/30
2003/0098955 A1 * 5/2003 Okuyama et al. ............. 353/31

FOREIGN PATENT DOCUMENTS

CN 1020962 5/1993
CN 1273370 11/2000
JP LO H10-319344 12/1998

OTHER PUBLICATIONS

Chinese Office Action dated Sep. 17, 2004 regarding Chinese Patent Application No. 021285764 with English Translation.
English translation of the Abstract and Description of Drawing of JPLO H10–319344.

* cited by examiner

*Primary Examiner*—David Gray
*Assistant Examiner*—Magda Cruz
(74) *Attorney, Agent, or Firm*—Morgan & Finnegan, L.L.P.

(57) ABSTRACT

An image display optical system according to the present invention has an illumination optical system, a plurality of image display elements, a color separation/combination optical system, and a projection optical system. The image display optical system also has a light guide element which reflects illumination light from the illumination optical system with a reflectivity of substantially 100% to guide the reflected light to the color separation/combination optical system and transmits image light from the color separation/combination optical system to the projection optical system.

Each optical path of the illumination light and each optical path of the image light are different from each other in the light guide element and the color separation/combination optical system. The projection optical system is an eccentric optical system.

With the configuration, the use efficiency of light can be enhanced to obtain bright and high-definition display images.

93 Claims, 26 Drawing Sheets

IMAGE DISPLAY OPTICAL SYSTEM AND PROJECTION TYPE IMAGE DISPLAY APPARATUS

BACKGROUND OF THE INVENTION

1. Field of the Invention

The present invention relates to an image display optical system which uses image display elements for modulating light and has an illumination optical system for illuminating the image display elements and a projection optical system for enlargedly projecting image light from the image display elements.

2. Description of the Related Art

A projection type image display apparatus has been conventionally used which uses an illumination optical system for illuminating an image display element and the image display element such as a liquid crystal display for modulating polarization of the illumination light to produce image light such that the image light from the image display element is enlargedly projected.

For example, Japanese Patent Application Laid-Open No. 10-319344 proposes an image display apparatus using a so-called reflection type image display element in which illumination light from the illumination optical system is incident on one side of the image display element and image light modulated by the image display element emits from the same side.

FIG. 21 shows the configuration of a conventional projection type image display apparatus. In FIG. 21, reference numeral 301 shows a light source, 302 a reflector, 303 a filter, 304 and 306 fly eye lenses. Reference numeral 305 shows a mirror, 307 a polarization beam splitter, 308 a color separation/combination prism, 309*r*, 309*g*, 309*b* image display elements, and 310 a projection lens.

An optical path IL of an illumination optical system and an optical path PL of a projection optical system are combined by the polarization beam splitter 307 to pass through the single color separation/combination prism 308.

The polarization beam splitter for combining the optical paths, however, is made from multilayer film, and if the angle of light incident on the multilayer film varies and thus deviates from a design angle (for example, 45 degrees), the efficiency is changed in separating the light into a P-polarized light component and an S-polarized light component to result in loss of light, thereby presenting a problem that the image display apparatus can only project dark images.

In addition, in the aforementioned image display apparatus, all the three image display elements 309*r*, 309*g*, and 309*b* are disposed in a plane including the reference axes of the illumination optical system and the projection optical system, that is, lines (axes) obtained by tracing a light ray along the center line of an illumination light flux in the illumination optical system, which presents a problem that the whole image display apparatus is likely to be increased in size in the direction of that plane.

Furthermore, when part of the illumination light is reflected on any transmission surface of a component such as the color separation/combination prism for directing the illumination light to the image display elements, the reflection may produce flare and cause a problem of the inability to obtain projected images of high quality.

SUMMARY OF THE INVENTION

It is an object of the present invention to provide an image display optical system and a projection type image display apparatus which allow improvement in the use efficiency of light to obtain bright and high-definition display images.

To achieve the aforementioned object, the present invention provides an image display optical system comprising:

an illumination optical system;

a plurality of image display elements, which modulate light incident thereon to emit image light;

a color separation/combination optical system which separates illumination light from the illumination optical system into a plurality of color components of the illumination to cause the separated light to be incident on the plurality of image display elements and combines the image light emitted from each of the plurality of image display elements;

a projection optical system which projects the image light combined by the color separation/combination optical system onto a projection surface; and a light guide element which is disposed between the illumination optical system and the color separation/combination optical system, reflects the illumination light from the illumination optical system with a reflectivity of substantially 100% to guide the reflected light to the color separation/combination optical system and transmits the image light the said color separation/combination optical system to the projection optical system.

And each optical path of the illumination light and each optical path of the image light are different from each other in the light guide element and the color separation/combination optical system, and the projection optical system is an eccentric optical system.

The present invention also provides an image display optical system comprising:

an illumination optical system;

a plurality of image display elements, which modulate light incident thereon to emit image light;

a color separation/combination optical system which separates illumination light from the illumination optical system into a plurality of color components of the illumination light to cause the separated light to be incident on the plurality of image display elements and combines the image light emitted from each of the plurality of image display elements;

a projection optical system which projects the image light combined by the color separation/combination optical system onto a projection surface; and a light guide element which is disposed between the illumination optical system and the color separation/combination optical system, reflects the illumination light from the illumination optical system with a reflectivity of substantially 100% to guide the reflected light to the color separation/combination optical system and transmits the image light from the color separation/combination optical system to the projection optical system.

And each reference axis on the side of the illumination light incident on each of the image display elements and each reference axis on the side of the image light emitted from each of the image display elements are inclined with respect to a normal to a display surface of each of the image display elements, the reference axis referring to a line obtained by tracing a light ray along a center line of an illumination light flux in the illumination optical system to the light guide element, the color separation/combination optical system, and the projection optical system, and the projection optical system is an eccentric optical system.

The present invention also provides an image display optical system comprising:

an illumination optical system;

a plurality of image display elements, which modulate light incident thereon to emit image light;

a color separation/combination optical system which separates illumination light from the illumination optical system into a plurality of color components of the illumination light to cause the separated light to be incident on the plurality of image display elements and combines the image light emitted from each of the plurality of image display elements;

a projection optical system which projects the image light combined by the color separation/combination optical system onto a projection surface; and a light guide element which is disposed between the illumination optical system and the color separation/combination optical system, transmits the illumination light from the illumination optical system to the color separation/combination optical system and reflects the image light from the color separation/combination optical system with a reflectivity of substantially 100% to guide the reflected light to the projection optical system.

And each optical path of the illumination light and each optical path of the image light are different from each other in the light guide element and the color separation/combination optical system, and the projection optical system is an eccentric optical system.

The present invention also provides an image display optical system comprising:

an illumination optical system;

a plurality of image display elements, which modulate light incident thereon to emit image light;

a color separation/combination optical system which separates illumination light from the illumination optical system into a plurality of color components of the illumination light to cause the separated light to be incident on the plurality of image display elements and combines the image light emitted from each of the plurality of image display elements;

a projection optical system which projects the image light combined by the color separation/combination optical system onto a projection surface; and a light guide element which is disposed between the illumination optical system and the color separation/combination optical system, transmits the illumination light from the illumination optical system to the color separation/combination optical system and reflects the image light from the color separation/combination optical system with a reflectivity of substantially 100% to guide the reflected light to the projection optical system.

And each reference axis on the side of the illumination light incident on each of the image display elements and each reference axis on the side of the image light emitted from each of the image display elements are inclined with respect to a normal to a display surface of each of the image display elements, the reference axis referring to a line obtained by tracing a light ray along a center line of an illumination light flux in the illumination optical system to the light guide element, the color separation/combination optical system, and the projection optical system, and the projection optical system is an eccentric optical system.

The present invention also provides an image display optical system comprising:

an illumination optical system;

a reflection type image display element which reflects illumination light from the illumination optical system and modulates the illumination light to emit image light; and a projection optical system which projects the image light emitted from the image display element onto a projection surface.

And the following condition is satisfied:

$$7 < FNO/\tan\theta < 46 \quad (1)$$

where θ represents an angle formed by a reference axis of the illumination light incident on the image display element and a reference axis of the image light emitted from the image display element with a normal to a display surface of the image display element, the reference axis referring to a line obtained by tracing a light ray along a center line of an illumination light flux in the illumination optical system to the illumination optical system and the projection optical system, and FNO represents an F number of the illumination optical system for the image display element.

The present invention also provides an image display optical system comprising:

an illumination optical system;

a plurality of image display elements, which modulate light incident thereon to emit image light;

a color separation/combination optical system which separates illumination light from the illumination optical system into a plurality of color components of the illumination light to cause the separated light to be incident on the plurality of image display elements and combines the image light emitted from each of the plurality of image display elements;

a projection optical system which projects the image light combined by the color separation/combination optical system onto a projection surface; and a light guide element which is disposed between the illumination optical system and the color separation/combination optical system, reflects the illumination light from the illumination optical system with a reflectivity of substantially 100% to guide the reflected light to the color separation/combination optical system and transmits the image light from the color separation/combination optical system to the projection optical system.

And each optical path of the illumination light and each optical path of the image light are different from each other in the light guide element and the color separation/combination optical system, at least one of the plurality of image display elements is disposed outside a plane including a reference axis of the illumination optical system and a reference axis of the projection optical system, the reference axis referring to a line obtained by tracing a light ray along a center line of an illumination light flux in the illumination optical system to the light guide element, the color separation/combination optical system, and the projection optical system, and the projection optical system is an eccentric optical system.

The present invention also provides an image display optical system comprising:

an illumination optical system;

a plurality of image display elements, which modulate light incident thereon to emit image light;

a color separation/combination optical system which separates illumination light from the illumination optical system into a plurality of color components of the illumination light to cause the separated light to be incident on the plurality of image display elements and combines the image light emitted from each of the plurality of image display elements;

a projection optical system which projects the image light combined by the color separation/combination optical system onto a projection surface; and a light guide element which is disposed between the illumination optical system and the color separation/combination optical system, reflects the illumination light from the illumination optical system with a reflectivity of substantially 100% to guide the reflected light to the color separation/combination optical system and transmits the image light from the color separation/combination optical system to the projection optical system.

And each reference axis on the side of the illumination light incident on each of the image display elements and each reference axis on the side of the image light emitted from each of the image display elements are inclined with respect to a normal to a display surface of each of the image display elements, the reference axis referring to a line obtained by tracing a light ray along a center line of an illumination light flux in the illumination optical system to the light guide element, the color separation/combination optical system, and the projection optical system, at least one of the plurality of image display elements is disposed outside a plane including the reference axis of the illumination optical system and the reference axis of the projection optical system, and the projection optical system is an eccentric optical system.

The present invention also provides an image display optical system comprising:

an illumination optical system;

a plurality of image display elements, which modulate light incident thereon to emit image light;

a color separation/combination optical system which separates illumination light from the illumination optical system into a plurality of color components of the illumination light to cause the separated light to be incident on the plurality of image display elements and combines the image light emitted from each of the plurality of image display elements;

a projection optical system which projects the image light combined by the color separation/combination optical system onto a projection surface; and a light guide element which is disposed between the illumination optical system and the color separation/combination optical system, transmits the illumination light from the illumination optical system to the color separation/combination optical system and reflects the image light from the color separation/combination optical system with a reflectivity of substantially 100% to guide the reflected light to the projection optical system.

And each optical path of the illumination light and each optical path of the image light are different from each other in the light guide element and the color separation/combination optical system, at least one of the plurality of image display elements is disposed outside a plane including a reference axis of the illumination optical system and a reference axis of the projection optical system, the reference axis referring to a line obtained by tracing a light ray along a center line of an illumination light flux in the illumination optical system to the light guide element, the color separation/combination optical system, and the projection optical system, and the projection optical system is an eccentric optical system.

The present invention also provides an image display optical system comprising:

an illumination optical system;

a plurality of image display elements, which modulate light incident thereon to emit image light;

a color separation/combination optical system which separates illumination light from the illumination optical system into a plurality of color components of the illumination light to cause the separated light to be incident on the plurality of image display elements and combines the image light emitted from each of the plurality of image display elements;

a projection optical system which projects the image light combined by the color separation/combination optical system onto a projection surface; and a light guide element which is disposed between the illumination optical system and the color separation/combination optical system and transmits the illumination light from the illumination optical system to the color separation/combination optical system and reflects the image light from the color separation/combination optical system with a reflectivity of substantially 100% to guide the reflected light to the projection optical system.

And each reference axis on the side of the illumination light incident on each of the image display elements and each reference axis on the side of the image light emitted from each of the image display elements are inclined with respect to a normal to a display surface of each of the image display elements, the reference axis referring to a line obtained by tracing a light ray along a center line of an illumination light flux in the illumination optical system to the light guide element, the color separation/combination optical system, and the projection optical system, at least one of the plurality of image display elements is disposed outside a plane including the reference axis of the illumination optical system and the reference axis of the projection optical system, and the projection optical system is an eccentric optical system.

The present invention also provides an image display optical system comprising:

an illumination optical system;

a plurality of image display elements, which modulate light incident thereon to emit image light;

a color separation/combination optical system which separates illumination light from the illumination optical system into a plurality of color components of the illumination light to cause the separated light to be incident on the plurality of image display elements and combines the image light emitted from each of the plurality of image display elements;

a projection optical system which projects the image light combined by the color separation/combination optical system onto a projection surface; and a light guide element which is disposed between the illumination optical system and the color separation/combination optical system, reflects the illumination light from the illumination optical system with a reflectivity of substantially 100% to guide the reflected light to the color separation/combination optical element and transmits the image light from the color separation/combination optical element to the projection optical system.

And each optical path of the illumination light and each optical path of the image light are different from each other in the light guide element and the color separation/combination optical element, and an antireflection film is formed on at least one transmission surface through which both the illumination light and the image light pass in at least one of the light guide element and the color separation/combination optical element. The projection optical system may be configured as an eccentric optical system.

The present invention also provides an image display optical system comprising:

an illumination optical system;

a plurality of image display elements, which modulate light incident thereon to emit image light;

a color separation/combination optical element which separates illumination light from the illumination optical system into a plurality of colors components of the illumination light to cause the separated light to be incident on the plurality of image display elements and combines the image light emitted from each of the plurality of image display elements;

a projection optical system which projects the image light combined by the color separation/combination optical element onto a projection surface; and a light guide element which is disposed between the illumination optical system and the color separation/combination optical element, reflects the illumination light from the illumination optical system with a reflectivity of substantially 100% to guide the reflected light to the color separation/combination optical element and transmits the image light from the color separation/combination optical element to the projection optical system.

And each reference axis on the side of the illumination light incident on each of the image display elements and each reference axis on the side of the image light emitted from each of the image display elements are inclined with respect to a normal line of a display surface of each of the image display elements, the reference axis referring to a line obtained by tracing a light ray along a center line of an illumination light flux in the illumination optical system to the light guide element, the color separation/combination optical element, and the projection optical system, and an antireflection film is formed on at least one transmission surface through which both the illumination light and the image light pass in at least one of the light guide element and the color separation/combination optical element.

The projection optical system may be configured as an eccentric optical system.

The present invention also provides an image display optical system comprising:

an illumination optical system;

a plurality of image display elements, which modulate light incident thereon to emit image light;

a color separation/combination optical element which separates illumination light from the illumination optical system into a plurality of color components of the illumination light to cause the separated light to be incident on the plurality of image display elements and combines the image light emitted from each of the plurality of image display elements;

a projection optical system which projects the image light combined by the color separation/combination optical element onto a projection surface; and a light guide element which is disposed between the illumination optical system and the color separation/combination optical element, transmits the illumination light from the illumination optical system to the color separation/combination optical element and reflects the image light from the color separation/combination optical element with a reflectivity of substantially 100% to guide the reflected light to the projection optical system.

And each optical path of the illumination light and each optical path of the image light are different from each other in the light guide element and the color separation/combination optical element, and an antireflection film is formed on at least one transmission surface through which both the illumination light and the image light pass in at least one of the light guide element and the color separation/combination optical element.

The projection optical system may be configured as an eccentric optical system.

The present invention also provides an image display optical system comprising:

an illumination optical system;

a plurality of image display elements, which modulate light incident thereon to emit image light;

a color separation/combination optical element which separates illumination light from the illumination optical system into a plurality of color components of the illumination light to cause the separated light to be incident on the plurality of image display elements and combines the image light emitted from each of the plurality of image display elements;

a projection optical system which projects the image light combined by the color separation/combination optical element onto a projection surface; and a light guide element which is disposed between the illumination optical system and the color separation/combination optical element, transmits the illumination light from the illumination optical system to the color separation/combination optical element and reflects the image light from the color separation/combination optical element with a reflectivity of substantially 100% to guide the reflected light to the projection optical system.

And each reference axis on the side of the illumination light incident on each of the image display elements and each reference axis on the side of the image light emitted from each of the image display elements are inclined with respect to a normal line of a display surface of each of the image display elements, the reference axis referring to a line obtained by tracing a light ray along a center line of an illumination light flux in the illumination optical system to the light guide element, the color separation/combination optical element, and the projection optical system, and an antireflection film is formed on at least one transmission surface through which both the illumination light and the image light pass in at least one of the light guide element and the color separation/combination optical element.

The projection optical system may be configured as an eccentric optical system.

When the antireflection films is formed, the antireflection film may be formed on each transmission surface such that a flare ratio F in the illumination optical system is 1/100 or lower, 1/200 or lower, or 1/800 or lower, where the flare ratio F is represented by:

$$F = \sum_{1}^{n} R_i$$

where n is the number of the at least one transmission surface and Ri (i=1 to n) is the reflectivity at each transmission surface.

In addition, it is preferable that the sum of the flare ratio F in the illumination optical system and the reflectivity Ri (i=1 to n) at each transmission surface may satisfy the following condition:

$$\sum_{1}^{n} R_i < F$$

When the flare ratio F which is the ratio between the amount of flare light caused by the illumination light and the amount of image light is set to:

$$F \leqq 1/100 \tag{2}$$

then antireflection films with a reflectivity of Ri≦0.25 may be formed on the surfaces through which both the illumination light and the image light pass and on the portion of the image display elements other than the image display areas.

When the flare ratio F is set to:

$$F \leqq 1/200 \tag{3}$$

then antireflection films with a reflectivity of Ri≦0.125 may be formed on the surfaces through which both the illumination light and the image light pass and on the portion of the image display elements other than the image display areas.

When the flare ratio F is set to:

$$F \leqq 1/800 \tag{4}$$

then antireflection films with a reflectivity of Ri≦0.031 may be formed on the surfaces through which both the illumination light and the image light pass and on the portion of the image display elements other than the image display areas.

In the projection type image display apparatus according to each aspect of the present invention, it is possible to use the light guide element having a first surface which receives the illumination light, a second surface which sends out the illumination light toward the color separation/combination optical system and receives the image light from the color separation/combination optical system, and a third surface which reflects the illumination light incident from the first surface with a reflectivity of substantially 100% toward the second surface and sends out the image light incident from the second surface toward the projection optical system.

It is also possible to use the light guide element having a first surface which receives the illumination light and reflects the image light with a reflectivity of substantially 100%, a second surface which sends out the illumination light incident form the first surface toward the color separation/combination optical system and receives the image light from the color separation/combination optical system, and a third surface which sends out the image light incident from the second surface and reflected by the first surface toward the projection optical system.

In addition, the image display optical system according to each aspect of the present invention may further comprise an auxiliary optical element which is disposed between the light guide element and the projection optical system with an air gap between the auxiliary optical element and the light guide element and refracts and transmits the image light from the light guide element.

The image display optical system according to each aspect of the present invention may further comprise an auxiliary optical element which is disposed between the light guide element and the illumination optical system with an air gap between the auxiliary optical element and the light guide element and refracts and transmits the illumination light from the illumination optical system.

Especially when the light guide element has a wedge shape, aberration produced in the light guide element can be reduced by disposing the auxiliary optical element for refracting and transmitting the image light emitted from the light guide element between the light guide element and the projection optical system with an air gap between the auxiliary optical element and the light guide element, or by disposing the auxiliary optical element for refracting and transmitting the illumination light from the illumination optical system between the light guide element and the illumination optical system with an air gap present between the auxiliary optical element and the light guide element.

A polarizing element may also be provided for transmitting only specific polarized light components between the color separation/combination optical element and the image display elements.

In addition, the light guide element may be bonded to the color separation/combination optical element, or the color separation/combination optical element may be bonded to the image display elements. This can reduce the occurrence of flare due to the illumination light.

A detailed configuration of the image display optical system and projection type image display apparatus of the invention, the above and other objects and features of the invention will be apparent from the embodiments, described below.

DESCRIPTION OF THE PREFERRED EMBODIMENTS

Hereinafter, preferred embodiments of the invention will be described in detail with reference to the drawings.

Figure 1:
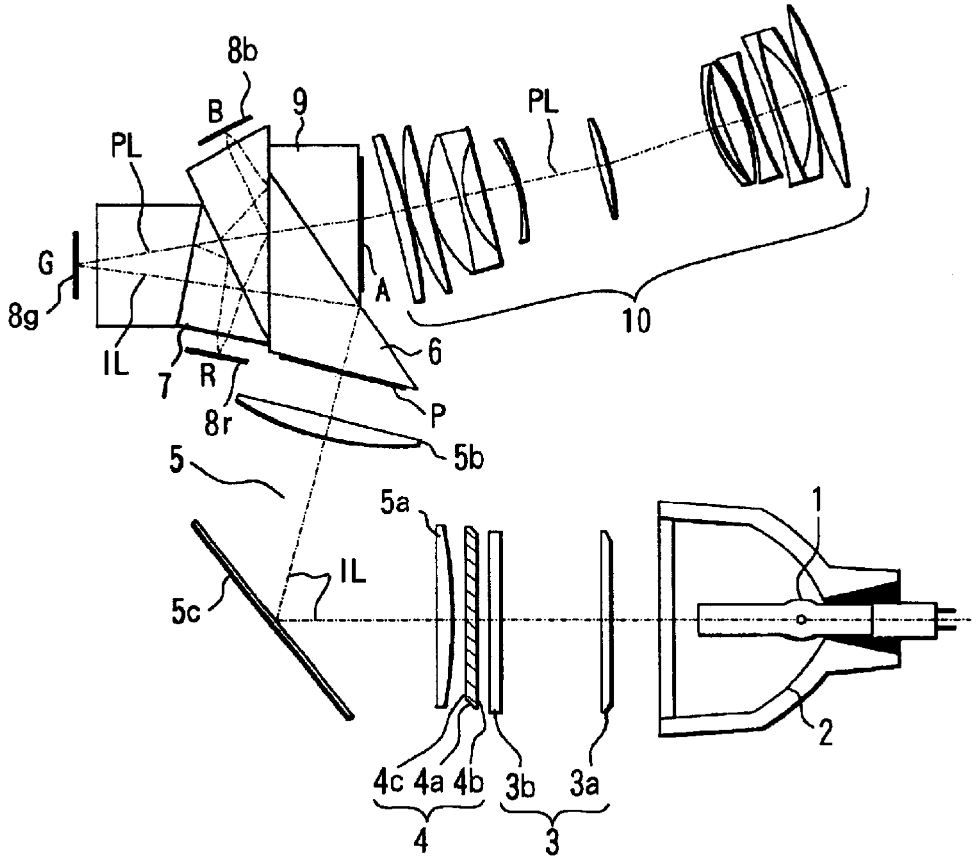
FIG. 1 shows the configuration of a projection type image display apparatus which is an embodiment of the present invention.

FIG. 1 shows the configuration of a projection type image display apparatus which is an embodiment of the present invention. In FIG. 1, reference numeral 1 shows an illumination light source formed of a high-pressure mercury-vapor lamp or the like, and reference numeral 2 shows a reflector for radiating light from the light source 1 in a predetermined direction.

Reference numeral 3 shows an integrator for forming a homogeneous illuminated area, and the integrator 3 is composed of fly eye lenses 3*a* and 3*b*.

Reference numeral 4 shows a polarization converting element for changing non-polarized light into light polarized in a predetermined direction, and the element 4 is composed of a polarization separating film 4*a*, a reflection film 4*b*, and a ½ phase plate 4*c*.

Reference numeral 5 shows a light condensing optical system for condensing illumination light, and the optical system 5 is composed of lenses 5*a*, 5*b* and a mirror 5*c*. The light source 1 through the lens 5*b* constitute an illumination optical system.

Reference numeral 6 shows an optical path prism (light guide element) for setting optical paths such that optical paths of the illumination optical system and a projection optical system pass through a single color separation/combination optical system.

Reference numeral 7 shows a dichroic prism (color separation/combination optical system) for separating the optical path into three for three colors of R, G, and B and then combining them. In the embodiment, the dichroic prism 7 is formed by combining three prisms and forming dichroic films on predetermined bonding surfaces through evaporation or the like.

Reference numerals 8*r*, 8*g*, and 8*b* show reflection type image display elements for respective color light components, formed of liquid crystal displays or the like. Each of the elements 8*r*, 8*g*, and 8*b* is driven by a signal in accordance with image information from an image information supply apparatus such as a personal computer, a television, a VTR, and a DVD player, not shown, and reflects and modulates illumination light of each color incident thereon and then sends out the modulated light.

Reference numeral 9 shows an auxiliary prism (auxiliary optical element), and 10 an eccentric projection lens (projection optical system). P shows a polarizer for the image display elements 8*r*, 8*g*, and 8*b*, and A shows an analyzer for the image display elements 8*r*, 8*g*, and 8*b*.

Next, the optical effects in the image display apparatus configured as above are described. An illumination light flux emitted radially from the light source 1 is reflected by the reflector 2 and condensed toward the fly eye lens 3*a*. The illumination light flux is separated into a plurality of light fluxes by the fly eye lens 3*a* and then superimposed one another on the image display elements 8*r*, 8*g*, and 8*b* by the effects of the fly eye lens 3*b* and the lenses 5*a*, 5*b* to form a homogeneous illuminated area on the image display elements.

A number of light fluxes emitted from the fly eye lens 3*b* are separated into P-polarized light and S-polarized light by the polarization separating film 4*a* corresponding to the respective light fluxes. The P-polarized light is converted to polarized light components in the same direction as the S-polarized light by the ½ phase plate 4*c*, while the S-polarized light is reflected by the reflection film 4*b* and radiated in the same direction as predetermined polarized light.

Figure 2:
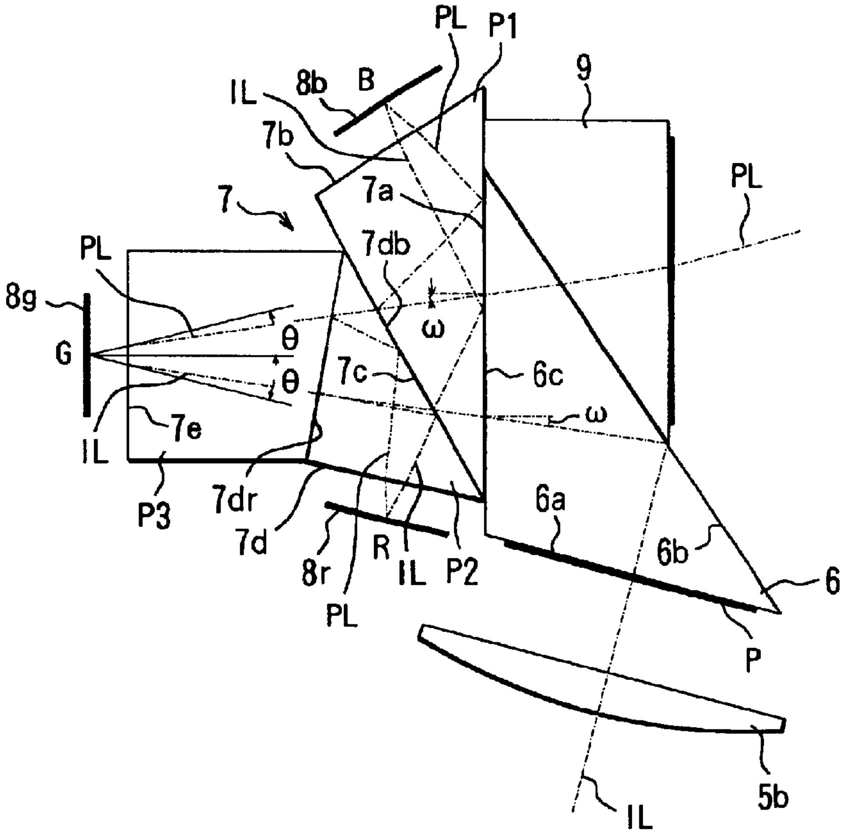
FIG. 2 is a partially enlarged view of the projection type image display apparatus shown in FIG. 1.

As shown in FIG. 2, the illumination light flux is incident on the optical path prism 6 from a first surface 6*a* at an angle which satisfies total reflection conditions in a second surface 6*b*, and thus totally reflected. This achieves reflection with a reflectivity of substantially 100%. The light flux emits from a third surface 6*c* after the optical path thereof is turned.

While the embodiment is described for the total reflection of the illumination light on the second surface 6*b* of the optical path prism 6, the reflection on the second surface 6*b* may be attained by mirror coating formed in part of the outer side of the second surface 6*b* through evaporation or the like.

In the embodiment, a 3P(piece) prism formed of three prisms (first to third prisms P1 to P3) is used as the dichroic prism 7.

In FIG. 2, light component of B (blue) incident on a first surface 7*a* of the first prism P1 is reflected by a first dichroic surface 7*db*, while light component of R (red) and light component of G (Green) pass through it.

The light component of B is reflected by the first surface 7*a* with a reflectivity of substantially 100% (that is, totally reflected) and then emits from a second surface 7*b* and reaches the image display element 8*b* for B.

The light component of R and the light component of G, which passed through the first dichroic surface 7*db*, are incident on a third surface 7*c* of the second prism P2 disposed with a slight air gap between itself and the surface 7*db*. The light component of R is reflected by a second dichroic surface 7*dr*, and the light component of G passes through it.

The light component of R is reflected by the third surface 7*c* with a reflectivity of substantially 100% (that is, totally reflected), and then emits from a fourth surface 7*d* and reaches the image display element 8*r* for R.

The light component of G, which passed through the second dichroic surface 7*dr*, is incident on the third prism P3, and then emits from a fifth surface 7*e* and reaches the image display element 8*g* for G.

In this manner, each color illumination light (each color light component) incident on each image display element is modulated in terms of polarization and reflected by each image display element driven by a signal in accordance with the aforementioned image information.

Image light produced from the modulation and reflection by each image display element is reflected in a direction different from the incident direction of the illumination light and incident on the dichroic prism 7, and combined into one and emits after passing through the optical surfaces in reverse order to that in the aforementioned color separation.

The light emitted from the dichroic prism 7 is incident on the optical path prism 6 from the third surface 6*c* at an angle smaller than the angle which satisfies the total reflection conditions in the second surface 6*b*, and passes through the second surface 6*b* and emits.

The light emitted from the optical path prism 6 passes through the auxiliary prism 9 with refraction, and is projected as a full color image on a screen (projection surface), not shown, by the eccentric projection lens 10 in FIG. 1.

In FIG. 1, when the reference axis of the illumination optical system is defined as the central axis of the illumination light flux, the reference axes of the optical systems can be considered as a straight line obtained by tracing the light ray along the optical axis of the reflector 2 to the subsequent components of the illumination optical system (5*a*, 5*b*, 5*c*) except for the fly eye lenses 3*a*, 3*b*, and the optical path prism 6, the dichroic prism 7, the image display elements 8*r* to 8*b*, the auxiliary prism 9, and the eccentric projection lens 10.

Based on this, IL is set as the reference axis of the illumination optical system and PL is set as the reference axis of the projection optical system in FIG. 1.

In the embodiment, as shown in FIG. 2, the reference axis IL of the illumination optical system after the color separation and the reference axis PL of the projection optical system are set to be inclined at an angle of θ with respect to the normal lines of the display surfaces of the image display elements 8*r* to 8*b*, respectively. Thus, the reference axis IL of the illumination optical system forms an angle of 2θ with and the reference axis PL of the projection optical system.

When an F number of the illumination optical system is represented as FNO, the diameter of the illumination light flux as ϕi, and the focal length of the condensing optical system 5 (a combined focal length of the lenses 5*a*, 5*b* in FIG. 1) as fi, the F number of the illumination optical system is determined by:

$$FNO=fi/\phi i$$

Since the fly eye lens 3 is rectangular in shape, the F number is determined by:

$$FNO=fi/Ll \text{ or } FNO=fi/Ls$$

By using a long side Ll or a short side Ls of the rectangular light flux when the illumination light flux is rectangular.

When the aforementioned inclined angle θ is increased, the angle 2θ formed by the reference axis of the illumination light path with the reference axis of the projection light path is increased, and an angle ω of incidence of the image light (or illumination light) on the optical path prism 6 is reduced, so that it is possible to achieve more homogeneous transmittance at incident angles of all light rays passing through the optical path prism 6. In the illumination optical system, the efficiency becomes higher as the F number of the illumination optical system is smaller.

On the other hand, in the eccentric optical system, the amount of eccentric aberration is smaller as the inclined angle θ on the object plane (image display element) is smaller. In addition, as the F number of the eccentric projection lens 10 is larger, the aberration is more readily corrected.

Since the F number of the eccentric projection lens 10 is set to be substantially equal to the F number of the illumination optical system, the following condition is desirably satisfied to realize an image display apparatus having a favorable eccentric optical system as a projection optical system and a high-efficiency illumination optical system:

$$7<FNO/\tan\theta<46 \quad (1)$$

As described above, in the embodiment, the optical path prism 6 for reflecting the illumination light from the illumination optical system with a reflectivity of substantially 100% to guide the reflected light to the dichroic prism 7 and transmitting the image light emitted from the dichroic prism 7 toward the eccentric projection lens 10 is provided between the illumination optical system and the dichroic prism 7 such that the optical path of the illumination light is different from the optical path of the image light in the optical path prism 6 and the dichroic prism 7.

Thus, the optical path of the illumination light can be separated from the optical path of the image light without providing a polarization beam splitter as conventional. The optical path prism 6 can reflect the illumination light from the illumination optical system with a reflectivity of substantially 100% to guide the reflected light to the dichroic prism 7 and transmit the image light from the image display elements 8*r* to 8*b* toward the eccentric projection lens 10.

Therefore, the use efficiency of light can be enhanced as compared with the conventional projection type image display apparatus to obtain bright display images.

In the embodiment, the eccentric projection lens 10 is configured as an eccentric optical system having at least one rotationally asymmetric surface or a plurality of optical elements with different rotational symmetry axes from one another, so that it is possible to correct eccentric aberration such as Keystone distortion caused by the inclination of the reference axis of the projection optical system.

While the optical path prism 6 is formed in wedge shape in the embodiment, aberration produced in the wedge shape can be reduced since the auxiliary prism 9 is disposed between the optical path prism 6 and the eccentric projection lens 10 with an air gap between itself and the optical path prism 6 for refracting and transmitting the image light emitted from the optical path prism 6.

Figure 3:
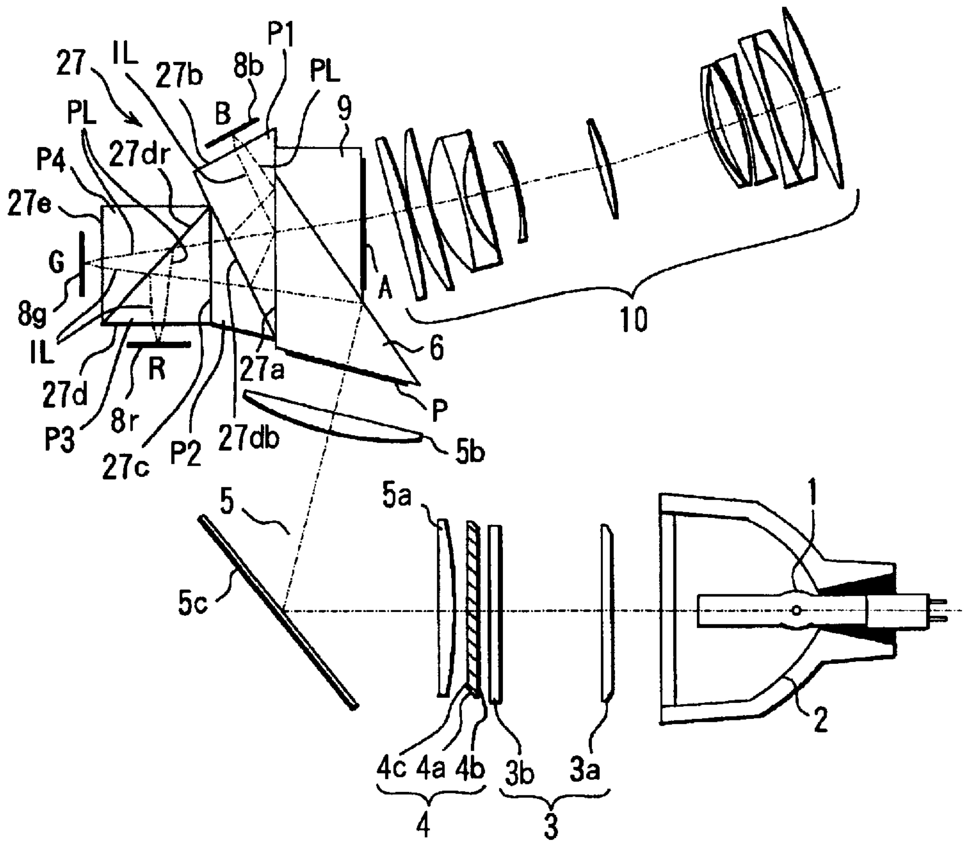
FIG. 3 shows the configuration of a projection type image display apparatus which is another embodiment of the present invention.

FIG. 3 shows the configuration of a projection type image display apparatus which is another embodiment of the present invention. The embodiment is the same as the first embodiment except for the use of a 4P prism formed of integrally combined four prisms P1 to P4 as a color separation/combination prism 27. Thus, in the embodiment, components identical to those in the embodiment in FIG. 1 are designated with the same reference numerals as those of the embodiment in FIG. 1, and description thereof is omitted.

The effects of the dichroic prism 27 in the embodiment are hereinafter described. In FIG. 2, illumination light emits from an optical path prism 6 and is incident on a first prism P1 of the dichroic prism 27 from a first surface 27*a*. Of that illumination light, light component of B is reflected by a first dichroic surface 27*db*, while light component of R and light component of G pass through it.

The light component of B is reflected by the first surface 27*a* with a reflectivity of substantially 100% (that is, totally reflected), and then emits from a second surface 27*b* and reaches an image display element 8*b* for B.

The light component of R and the light component of G, which passed through the first dichroic surface 27*db*, pass through a third surface 27*c*. The light component of R is reflected by a second dichroic surface 27*dr*, while the light component of G passes through it.

The light component of R emits from a fourth surface 27*d* of the third prism P3 and reaches an image display element 8*r* for R. The light component of G, passed through the second dichroic surface 27*dr*, emits from a fifth surface 27*e* of the fourth prism P4 and reaches an image display element 8*g* for G.

The color separation/combination prism 27, composed of the four prisms provided with the third surface 27*c* as in the embodiment, is advantageous in reducing the size of the dichroic prism as compared with the 3P prism as in the embodiment in FIG. 1.

Figure 4:
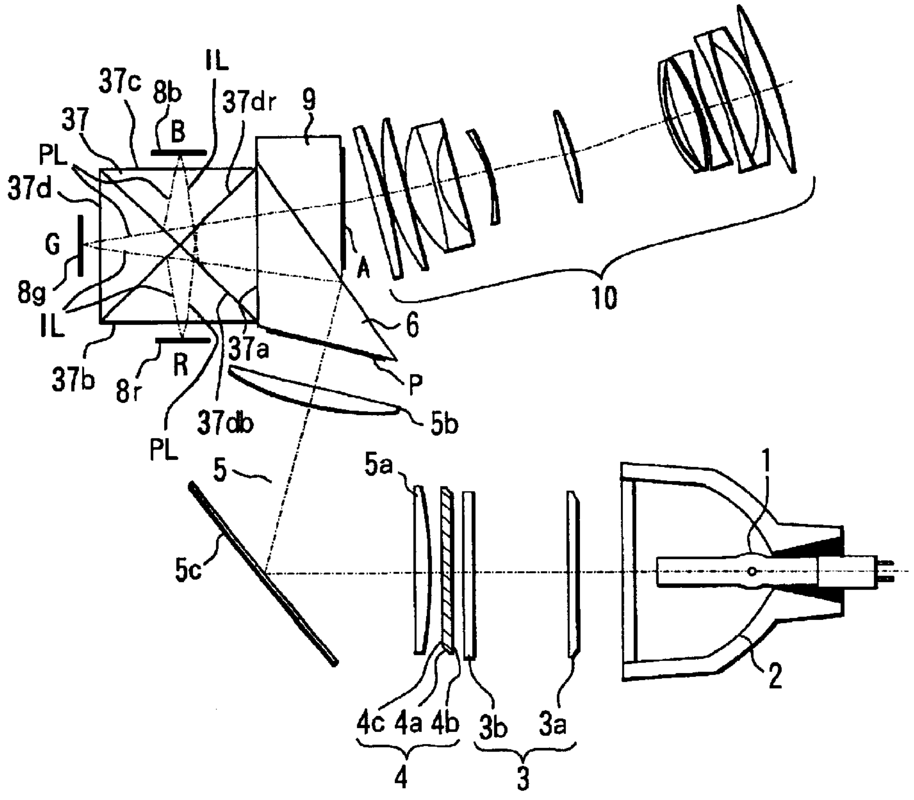
FIG. 4 shows the configuration of a projection type image display apparatus which is a yet another embodiment of the present invention.

FIG. 4 shows the configuration of a projection type image display apparatus which is a yet another embodiment of the present invention. The embodiment is the same as the embodiment in FIG. 1 except for the use of a dichroic prism 37 formed of integrally combined four prisms P1 to P4 such that its dichroic surfaces are crossed in the shape of a letter x. Thus, components identical to those in the embodiment in FIG. 1 are designated with the same reference numerals as those of the embodiment in FIG. 1, and description thereof is omitted.

The effects of the dichroic prism 37 in the embodiment are hereinafter described. In FIG. 4, illumination light emits from an optical path prism 6 and is incident on the dichroic prism 37 from a first surface 37*a*. Of that illumination light, light component of B reflected by a first dichroic surface 37*db* passes through a second surface 37*c* and reaches an image display element 8*b* for B.

Light component of R reflected by a second dichroic surface 37*dr* passes through a third surface 37*b* and reaches an image display element 8*r* for R.

Light component of G passing through the first dichroic surface 37*db* and the second dichroic surface 37*dr* passes through a fourth surface 37*d* and reaches an image display element 8*g* for G.

Figure 5:
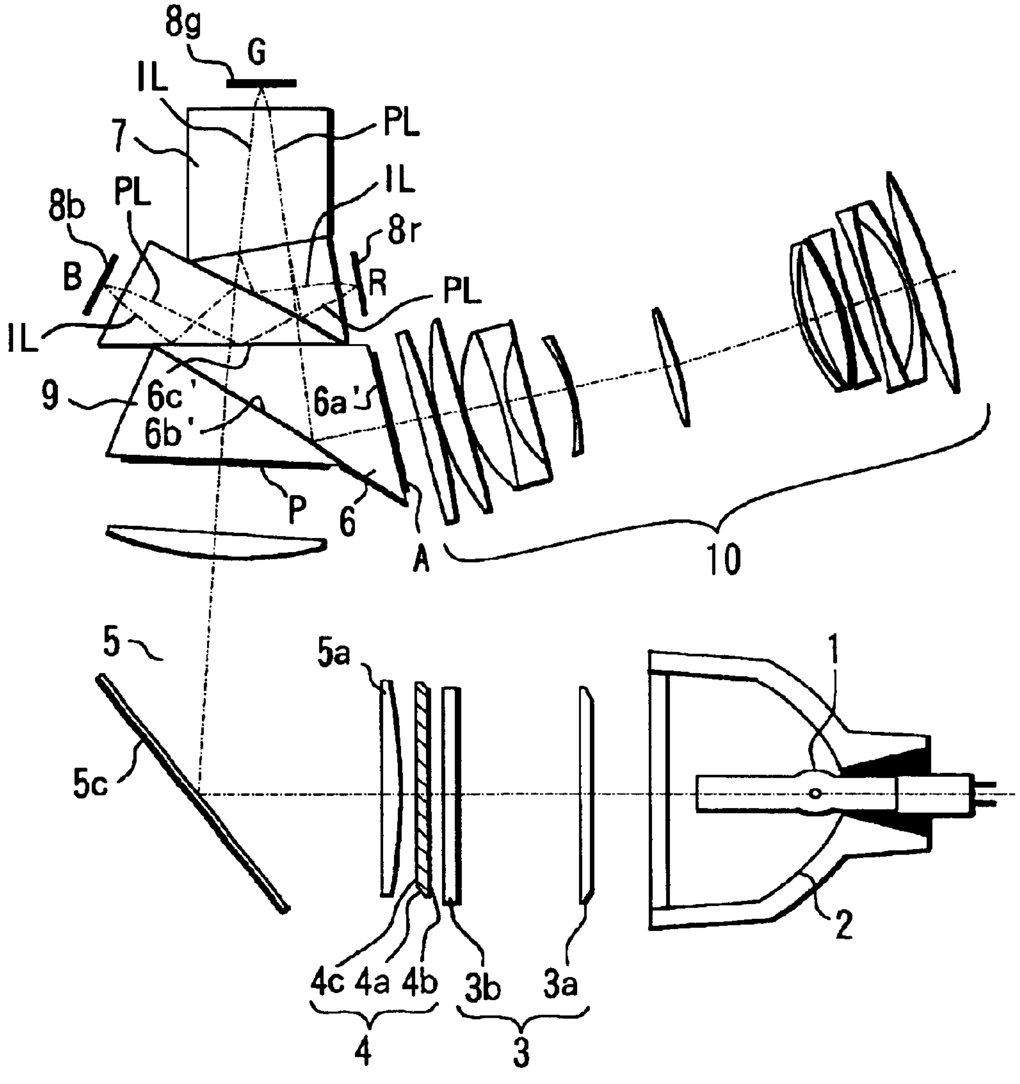
FIG. 5 shows the configuration of a projection type image display apparatus which is a further embodiment of the present invention.

FIG. 5 shows the configuration of a projection type image display apparatus which is a further embodiment of the present invention.

The embodiment is the same as the aforementioned respective embodiments except for light traveling in an optical path prism 6. Thus, components identical to those in the embodiment in FIG. 1 are designated with the same reference numerals as those of the embodiment in FIG. 1, and description thereof is omitted.

In the embodiment, illumination light after passing through a lens 5*b* first passes through an auxiliary prism 9 with refraction and then is incident on a first surface 6*b*' of the optical path prism 6, passes through a second surface 6*c*' and is incident on a dichroic prism 7.

In the dichroic prism 7, as in the embodiment of FIG. 1, the light is separated into each color light component of R, G, and B which is incident on each of image display elements 8*r* to 8*b* where the light components are modulated. The light components are combined and then incident on the optical path prism 6 from the second surface 6*c*'.

The image light entering the optical path prism 6 is totally reflected by the first surface 6*b*', emits from a third surface 6*a*' and then is projected by an eccentric projection lens 10.

In the embodiment, the optical path prism 6 for transmitting the illumination light from the illumination optical system to the dichroic prism 7 and reflecting the image light from the dichroic prism 7 with a reflectivity of substantially 100% and transmitting the reflected light toward the eccentric projection lens 10 is provided between the illumination optical system and the dichroic prism 7 such that the optical path of the illumination light is different from the optical path of the image light in the optical path prism 6 and the dichroic prism 7. Thus, the optical path of the illumination light can be separated from the optical path of the image light without providing a polarization beam splitter as conventional. In addition, the optical path prism 6 can reflect the image light from the dichroic prism 7 with a reflectivity of substantially 100% to guide the reflected light to the eccentric projection lens 10.

Therefore, the use efficiency of light can be enhanced as compared with the conventional projection type image display apparatus to obtain bright display images.

Figure 6:
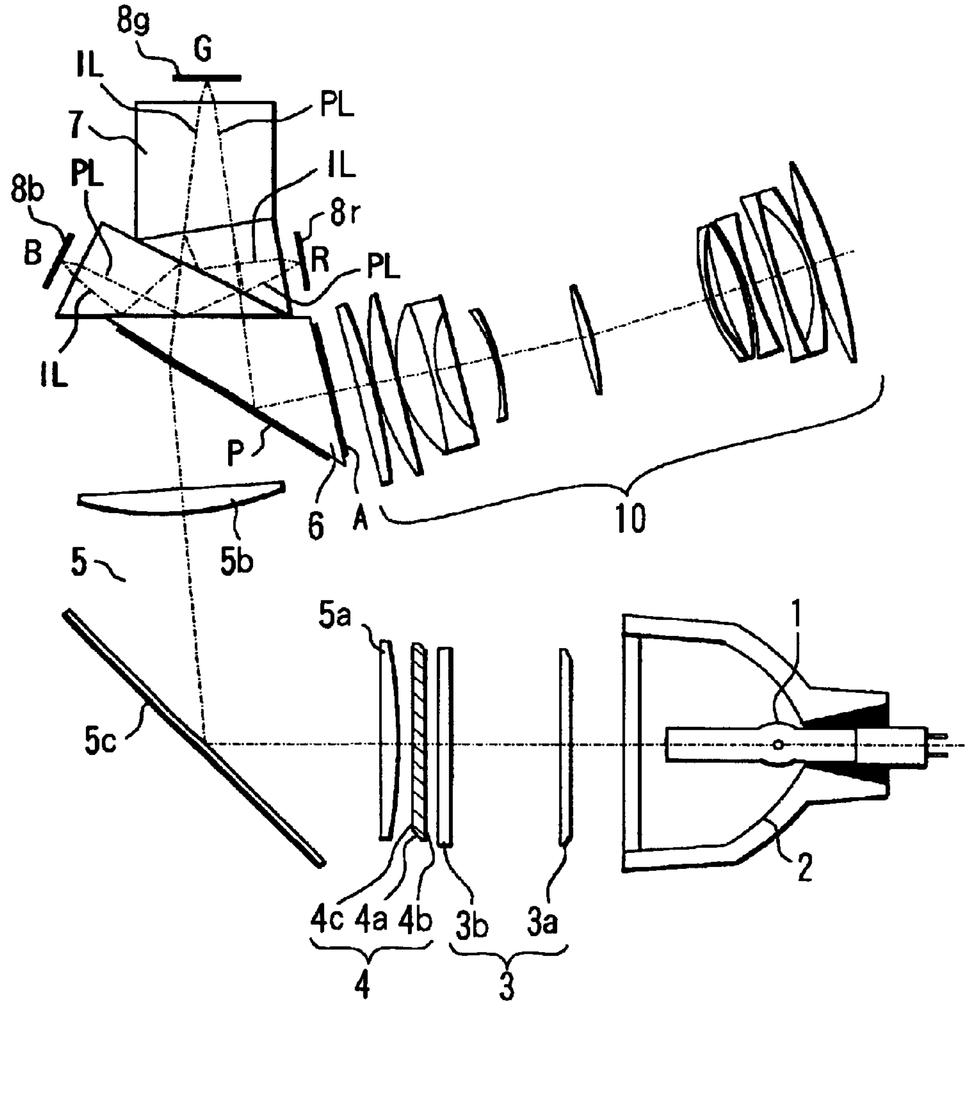
FIG. 6 shows the configuration of a projection type image display apparatus which is a yet further embodiment of the present invention.

FIG. 6 shows the configuration of a projection type image display apparatus which is a yet further embodiment of the present invention. The embodiment is identical to the embodiment in FIG. 5 in traveling of illumination light, but has a configuration eliminating the auxiliary prism 9 shown in the embodiment of FIG. 5. In the embodiment, components identical to those in the embodiment shown in FIG. 5 are designated with the same reference numerals as those of the embodiment in FIG. 5, and description thereof is omitted.

As shown in the embodiment, the auxiliary prism is not necessarily provided in the present invention.

It should be noted that the arrangement of the image display elements for the respective color light components in the present invention is not limited to those described in the aforementioned respective embodiments, and may be arbitrarily designed.

In addition, the projection type image display apparatuses described in the aforementioned embodiments may be applied to an image display system which receives an image signal transmitted from an image recording apparatus, a computer or the like and projects an image onto a projection surface based on the image signal.

As described above, according to the embodiments shown in FIG. 1 to FIG. 6, the optical path of the illumination light can be separated from the optical path of the image light without providing a polarization beam splitter as conventional. In addition, the light guide element can reflect the illumination light from the illumination optical system or the image light from the color separation/combination optical system with a reflectivity of substantially 100% and guide the reflected light to the color separation/combination optical system or the projection optical system. Thus, the use efficiency of light can be enhanced as compared with the conventional projection type image display apparatus to obtain bright and high-definition display images.

Furthermore, the eccentric optical system is used as the projection optical system to enable correction of eccentric aberration such as Keystone distortion caused by the inclination of the projection optical system.

When each reference axis on the side of the illumination light incident on each image display element and each reference axis on the side of the image light emitted from each image display element are set to be inclined to the normal to the display surface of each image display element, the projection optical system can be reduced in size.

Specifically, in the projection type image display apparatus, the image is projected at a position above its body, but the lens must be shifted to realize that position in a coaxial system, resulting in a larger lens diameter. In contrast, when the eccentric optical system is used and the reference axis (optical axis) is inclined as in the embodiment, the image light is projected upward and thus the optical system may be disposed along the reference axis (optical axis), so that the lens is reduced in size due to no shift.

When the reference axis of the illumination light is disposed to be inclined at an inclined angle of θ with respect to the normal line of the display surface of each image display element, the reference axis of the image light is also inclined on the opposite side at the inclined angle of θ with respect to the normal line of the display surface of each image display element. In this event, when the inclined angle θ is increased, the angle 2θ formed by the reference axis of the illumination light path with the reference axis of the projection light path is increased, and an angle ω of incidence of the projection light path (or illumination light path) on the light guide element is reduced, so that it is possible to achieve more homogeneous transmittance at incident angles of all light rays passing through the light guide element. In the illumination optical system, the efficiency becomes higher as the F number of the illumination optical system is smaller.

On the other hand, in the eccentric optical system, the amount of eccentric aberration is smaller as the inclined angle θ on the object plane (image display element) is smaller. In addition, the F number of the projection optical system is desirably larger since the aberration is more readily corrected.

In addition, it is possible to realize an image display apparatus having a favorable eccentric optical system as a projection optical system and a high-efficiency illumination optical system if the following is satisfied:

$$7 < FNO/\tan\theta < 46 \quad (1)$$

where θ represents the inclined angle of the reference axis on the illumination light side and the reference axis on the image light side with respect to the normal line of the image display element, and FNO represents the F number of the illumination optical system.

The F number of the projection optical system is set to be substantially equal to the F number of the illumination optical system, the aforementioned expression (1), where FNO represents the F number of the illumination optical system, is desirably satisfied to realize an image display optical system (especially when the eccentric optical system is used as the projection optical system) having a high-efficiency illumination optical system.

If FNO is smaller than the lower limit in the condition, the incident angle is too large as compared with FNO. Thus, aberration such as Keystone distortion is difficult to correct, and the projection optical system cannot be designed favorably. On the other hand, if FNO is larger than the upper limit, FNO is too large as compared with the incident angle. Thus, vignetting of light is increased in the projection optical system to reduce the use efficiency of light.

When the light guide element is formed in wedge shape, aberration produced in the wedge shape can be reduced by disposing the auxiliary optical element for refracting and transmitting the image light emitted from the light guide element between the light guide element and the projection optical system with an air gap between the auxiliary optical element and the light guide element, or by disposing the auxiliary optical element for refracting and transmitting the illumination light from the illumination optical system between the light guide element and the illumination optical system with an air gap present between the auxiliary optical element and the light guide element.

FIG. 7(A) shows the configuration of a projection type image display apparatus which is another embodiment of the present invention. In FIG. 7(A), reference numeral 101 shows an illumination light source formed of a high-pressure mercury-vapor lamp or the like, and reference numeral 102 shows a reflector for radiating light from the light source 101 in a predetermined direction.

Reference numeral 103 shows an integrator for forming a homogeneous illuminated area, and the integrator 103 is composed of fly eye lenses 103*a* and 103*b*.

Reference numeral 104 shows a polarization converting element for changing non-polarized light into light polarized in a predetermined direction, and the element 4 is composed of a polarization separating film 104*a*, a reflection film 104*b*, and a ½ phase plate 104*c*.

Reference numeral 105 shows a light condensing optical system for condensing illumination light, and the optical system 105 is composed of lenses 105*a*, 105*b* and a mirror 105*c*. The light source 101 through the lens 105*b* constitute an illumination optical system.

Reference numeral 106 shows an optical path prism (light guide element) for setting optical paths such that optical paths of the illumination optical system and a projection optical system pass through a single color separation/combination optical system.

Reference numeral 107 shows a dichroic prism (color separation/combination optical system) for separating the optical path into three for three colors of R, G, and B and combining them. In the embodiment, the dichroic prism is formed by combining three prisms and forming dichroic films on predetermined bonding surfaces through evaporation or the like.

Reference numerals **108*r*, 108*g*, and 108*b* show reflection type image display elements for respective color light components, formed of liquid crystal displays or the like. Each of the elements 108*r*, 108*g*, and 108*b*** is driven by a signal in accordance with image information from an image information supply apparatus such as a personal computer, a television, a VTR, and a DVD player, not shown, and reflects and modulates each color light component of the illumination light incident thereon and then sends out the modulated light (image light).

Reference numeral 109 shows an auxiliary prism (auxiliary optical element), and 110 an eccentric projection lens (projection optical system). P shows a polarizer for the image display elements **108*r*, 108*g*, and 108*b*, and A shows an analyzer for the image display elements 108*r*, 108*g*, and 108*b***.

Figure 7:
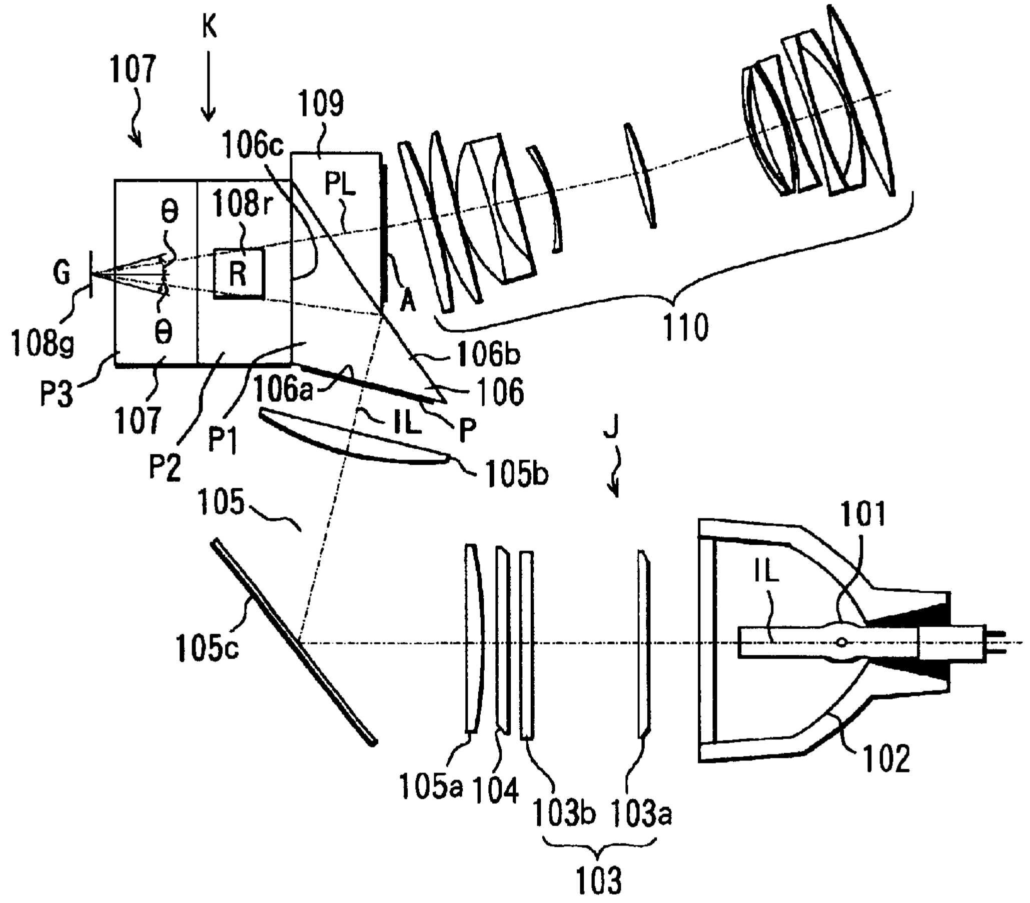
FIG. 7(A) shows the configuration of a projection type image display apparatus which is another embodiment of the present invention.
FIG. 7(B) is a diagram viewed from the direction indicated by an arrow K in FIG. 7(A)
Figure 7:
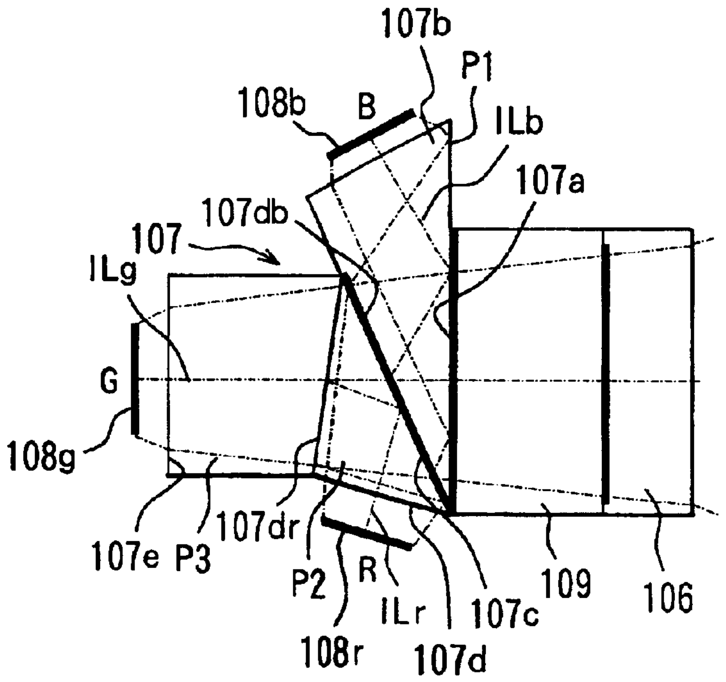
Figure 8:
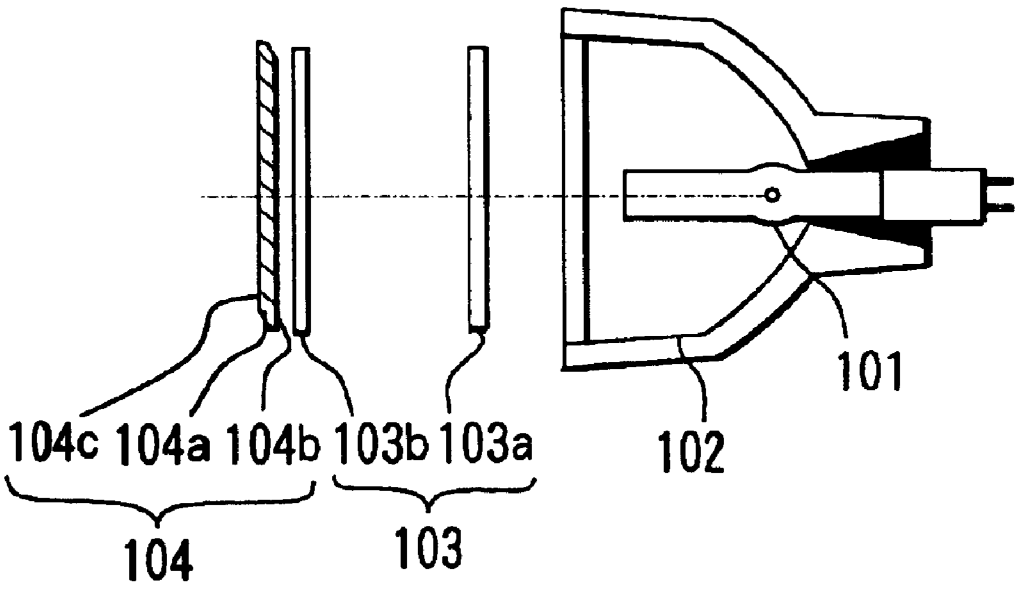
FIG. 8 shows part of the projection type image display apparatus shown in FIG. 7(A) viewed from the direction indicated by an arrow J.

FIG. 7(B) shows the arrangement of the aforementioned optical path prism 106, the color separation/combination prism 107, the auxiliary prism 109, and the image display elements **108*r*, 108*g*, and 108*b* from the direction indicated by an arrow K in FIG. 7(A). FIG. 8 shows part of the integrator 103 from the direction indicated by an arrow J shown in FIG. 7**(A).

Next, the optical actions in the image display apparatus configured as above are described. An illumination light flux emitted radially from the light source 101 is reflected by the reflector 102 and condensed toward the fly eye lens **103*a*. The illumination light flux is separated into a plurality of light fluxes by the fly eye lens 103*a* and then superimposed one another on the image display elements 108*r*, 108*g*, and 108*b* by the effects of the fly eye lens 103*b* and the lenses 105*a*, 105*b*** to form a homogeneous illuminated area on the image display elements.

A number of light fluxes emitted from the fly eye lens **103*b* are separated into P-polarized light and S-polarized light by the polarization separating film 104*a* corresponding to the respective light fluxes. The P-polarized light is converted to polarized light components in the same direction as the S-polarized light by the ½ phase plate 104*c*, while the S-polarized light is reflected by the reflection film 104*b*** and radiated in the same direction as predetermined polarized light. Alternatively, unlike the embodiment, the ½ phase plate may be provided on the optical path of the S-polarized light separated by the polarization separating film to perform polarization conversion for matching with the direction of the S-polarized light.

The illumination light flux is incident on the optical path prism 106 from a first surface **106*a* at an angle which satisfies total reflection conditions in a second surface 106*b*, and thus totally reflected. This achieves reflection with a reflectivity of substantially 100%. The light flux emits from a third surface 106*c*** after the optical path thereof is turned.

While the embodiment is described for the total reflection of the illumination light on the second surface **106*b* of the optical path prism 106, the reflection on the second surface 106*b* may be attained by mirror coating formed in part of the outer side of the second surface 106*b*** through evaporation or the like.

In the embodiment, a 3P(piece) prism formed of three prisms (first to third prisms P1 to P3) is used as the color separation/combination prism 107.

Light component of B incident on a first surface **107*a* of the first prism P1 is reflected by a first dichroic surface 107*db***, while light component of R (red) and light component of G (Green) pass through it.

The light component of B is reflected by the first surface **107*a* with a reflectivity of substantially 100% (for example, totally reflected) and then emits from a second surface 107*b* and reaches the image display element 108*b*** for B.

The light component of R and the light component of G, which passed through the first dichroic surface **107*db*, are incident a third surface 107*c* of the second prism P2 disposed with a slight air gap between itself and the surface 107*db*. The light component of R is reflected by a second dichroic surface 107*dr***, while the light component of G passes through it.

The light component of R is reflected by the third surface **107*c* with a reflectivity of substantially 100% (for example, totally reflected), and then emits from a fourth surface 107*d* and reaches the image display element 108*r*** for R.

The light component of G, which passed through the second dichroic surface **107*dr*, is incident on the third prism P3, and then emits from a fifth surface 107*e* and reaches the image display element 108*g*** for G.

In this manner, each color illumination light (each color light component) incident on each image display element is modulated in terms of polarization and reflected by each image display element driven by a signal in accordance with the aforementioned image information.

Image light modulated and reflected by each image display element is reflected in a direction different from the incident direction of the illumination light and incident on the color separation/combination prism 107, and combined into one and emits after passing through the optical surfaces in reverse order to that in the aforementioned color separation.

The light emitted from the color separation/combination prism 107 is incident on the optical path prism 106 from the third surface **106*c* at an angle smaller than the angle which satisfies the total reflection conditions in the second surface 106*b*, and passes through the second surface 106*b*** and emits.

The light emitted from the optical path prism 106 passes through the auxiliary prism 109 with refraction, and is projected as a full color image on a screen (projection surface), not shown, by the eccentric projection lens 110.

In FIGS. 7(A), 7(B), when the reference axis of the illumination optical system is defined as the central axis of the illumination light flux, the reference axes of the optical systems can be considered as a straight line obtained by tracing the light ray along the optical axis of the reflector 102 to the subsequent components of the illumination optical system (**105*a*, 105*b*, 105*c*) except for the fly eye lenses 103*a*, 103*b*, and the optical path prism 106, the color separation/combination prism 107, the image display elements 108*r* to 108*b*, the auxiliary prism 109, and the eccentric projection lens 110**.

Based on this, IL is set as the reference axis of the illumination optical system and PL is set as the reference axis of the projection optical system.

In the embodiment, the reference axis IL of the illumination optical system after the color separation and the reference axis PL of the projection optical system are set to be inclined at an angle of θ with respect to the normal lines of the display surfaces of the image display elements **108*r* to 108*b***, respectively. Thus, the reference axis IL of the illumination optical system forms an angle of 2θ with the reference axis PL of the projection optical system.

Although not shown in FIGS. 7(A) and 7(B), each of the light component of B and the light component of R has an incident light path (illumination light path) and an emitted light path (image light path) onto and from each of the image display elements **108*b*, 108*r* different from each other in the color separation/combination prism 107**, similarly to the light component of G.

When the aforementioned inclined angle θ is increased, the angle 2θ formed by the reference axis of the illumination light path with the reference axis of the projection light path is increased, and an angle ω of incidence of the image light (or illumination light) on the optical path prism 106 is reduced, so that it is possible to achieve more homogeneous transmittance at incident angles of all light rays passing through the optical path prism 106. In the illumination optical system, the efficiency becomes higher as the F number of the illumination optical system is smaller.

On the other hand, in the eccentric optical system, the amount of eccentric aberration is smaller as the inclined angle θ on the object plane (image display element) is smaller. As the F number of the eccentric projection lens 110 is larger, the aberration is more readily corrected.

The plane including the reference axis IL of the illumination optical system incident on the optical path prism 106 and the reference axis PL of the projection optical system emitted from the auxiliary prism extends in the direction of the sheet in FIG. 7(A) and in the direction perpendicular to the sheet in FIG. 8.

When the reference axes of the optical paths of the illumination optical system and the projection optical system color-separated by the color separation/combination prism 107 are defined as ILr, ILg, and ILb, respectively, these reference axes are not present in the plane of the sheet of FIG. 7(A). The image display elements 108*r*, 108*b* for R, B are present outside the plane including the reference axis IL of the illumination optical system and the reference axis PL of the projection optical system.

This configuration enables a reduction in the size of the apparatus in the direction of that plane as compared with the configuration including all the three image display elements in the aforementioned plane.

Higher efficient is achieved when the polarized components are separated in the long side directions of the image display elements 108*r*, 108*g*, and 108*b*, so that the embodiment employs the polarization converting element having the polarization separating film 104*a* and the reflection film 104*b* in order as shown in FIG. 8.

In the embodiment, the optical path prism 106 for reflecting the illumination light from the illumination optical system with a reflectivity of substantially 100% to guide the reflected light to the color separation/combination prism 107 and transmitting the image light emitted from the color separation/combination prism 107 toward the eccentric projection lens 110 is provided between the illumination optical system and the color separation/combination prism 107 such that the optical path of the illumination light is different from the optical path of the image light in the optical path prism 106 and the color separation/combination prism 107. Thus, the optical path of the illumination light can be separated from the optical path of the image light without providing a polarization beam splitter as conventional.

In addition, the optical path prism 106 can reflect the illumination light from the illumination optical system with a reflectivity of substantially 100% to guide the reflected light to the color separation/combination prism 107 and transmit the image light from the image display elements 108*r* to 108*b* toward the eccentric projection lens 110.

Therefore, the use efficiency of light can be enhanced as compared with the conventional projection type image display apparatus to obtain bright display images.

In the embodiment, the eccentric projection lens 110 is configured as an eccentric optical system having at least one rotationally asymmetric surface or a plurality of optical elements with different rotational symmetry axes from one another, so that it is possible to correct eccentric aberration such as Keystone distortion caused by the inclination of the reference axis of the projection optical system.

While the optical path prism 106 is formed in wedge shape in the embodiment, aberration produced in the wedge shape can be reduced since the auxiliary prism 109 is disposed between the optical path prism 106 and the eccentric projection lens 110 with an air gap between itself and the optical path prism 106 for refracting and transmitting the image light emitted from the optical path prism 106.

Figure 9:
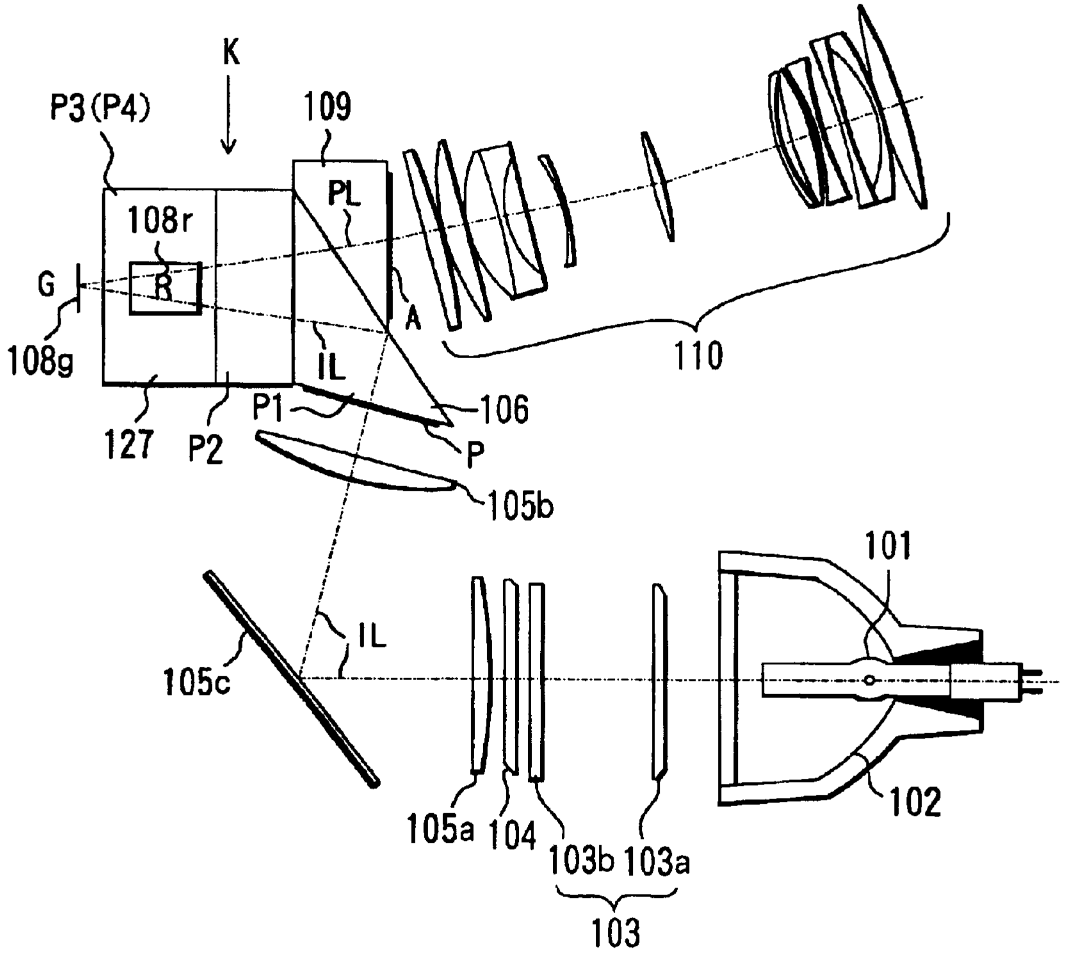
FIG. 9(A) shows the configuration of a projection type image display apparatus which is a yet another embodiment of the present invention.
FIG. 9(B) is a diagram viewed from the direction indicated by an arrow K shown in FIG. 9(A)
Figure 9:
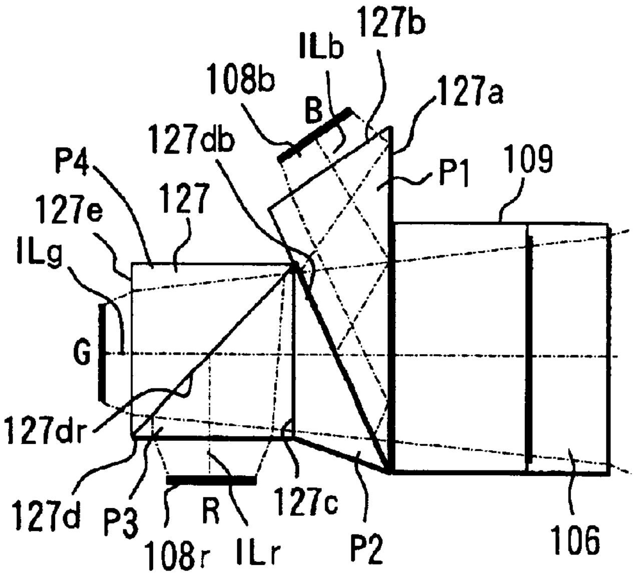

FIG. 9(A) shows the configuration of a projection type image display apparatus which is a yet another embodiment of the present invention. FIG. 9(B) shows part of an optical path prism 106 and a color separation/combination prism 127 from the direction indicated by an arrow K shown in FIG. 9(A).

The embodiment is the same as the embodiment shown in FIG. 7 except for the use of a 4P prism formed of integrally combined four prisms P1 to P4 as the color separation/combination prism 127. Thus, in the embodiment, components identical to those in the embodiment in FIG. 7 are designated with the same reference numerals as those of the embodiment in FIG. 7, and description thereof is omitted.

The effects of the color separation/combination prism 127 are hereinafter described. Of illumination light incident on a first prism P1 from a first surface 127*a*, light component of B is reflected by a first dichroic surface 127*db*, while light component of R and light component of G pass through it.

The light component of B is reflected by the first surface 127*a* with a reflectivity of substantially 100% (that is, totally reflected), and then emits from a second surface 127*b* and reaches an image display element 108*b* for B.

The light component of R and the light component of G, which passed through the first dichroic surface 127*db*, pass through a third surface 127*c*. The light component of R is reflected by a second dichroic surface 127*dr*, while the light component of G passes through it.

The light component of R emits from a fourth surface 127*d* of a third prism P3 and reaches an image display element 108*r* for R. The light component of G, passed through the second dichroic surface 127*dr*, emits from a fifth surface 127*e* of a fourth prism P4 and reaches an image display element 108*g* for G.

In the embodiment, like the previous embodiment, when the reference axes of the optical paths of the illumination optical system and the projection optical system color-separated by the color separation/combination prism 107 are defined as ILr, ILg, and ILb, respectively, these reference axes are not present in the plane of the sheet of FIG. 9(A) which includes the reference axis IL of the illumination optical system and the reference axis PL of the projection optical system emitted from the auxiliary prism, and the image display elements 108*r*, 108*b* for R, B are present outside that plane.

The color separation/combination prism 127, composed of the four prisms provided with the third surface 127*c* as in the embodiment, is advantageous in reducing the size of the color separation/combination prism as compared with the 3P prism as in the embodiment in FIGS. 7(A) and (B).

Figure 10:
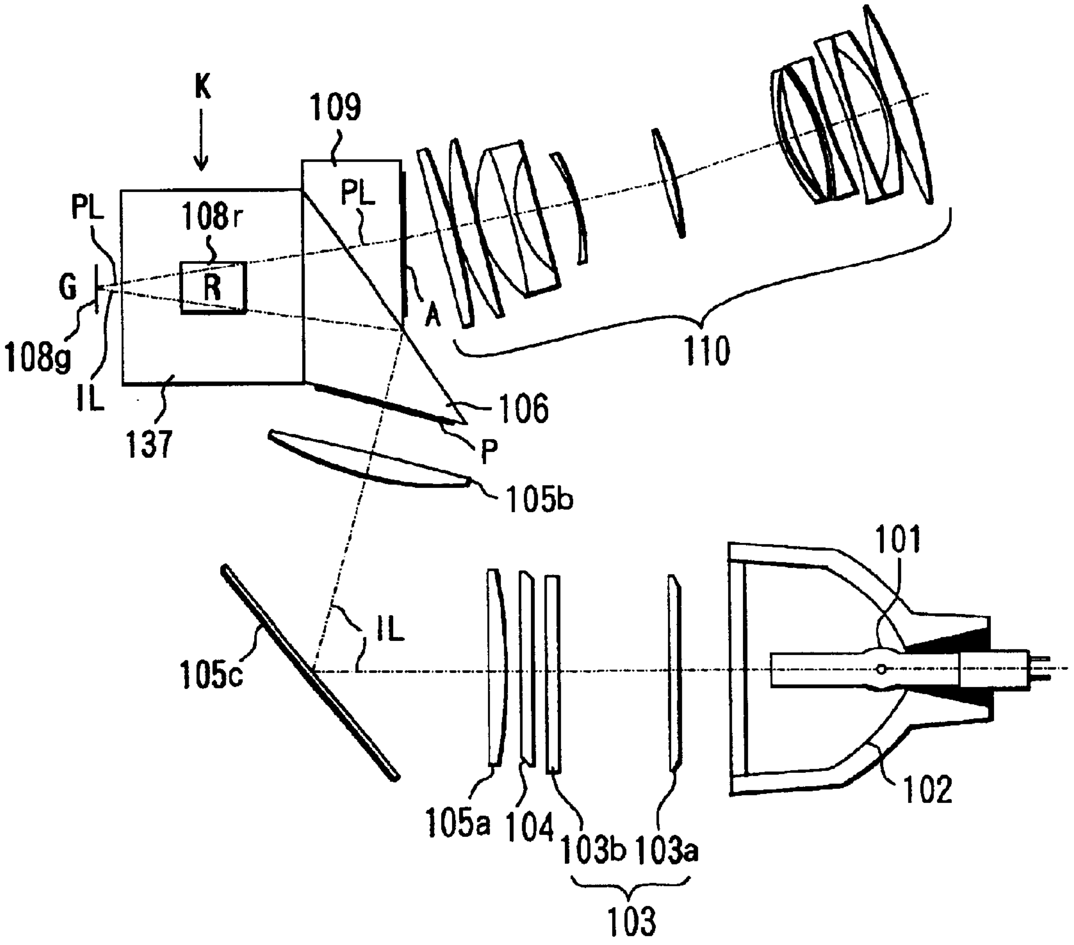
FIG. 10(A) shows the configuration of a projection type image display apparatus which is a further embodiment of the present invention.
FIG. 10(B) is a diagram viewed from the direction indicated by an arrow K shown in FIG. 10(A)
Figure 10:
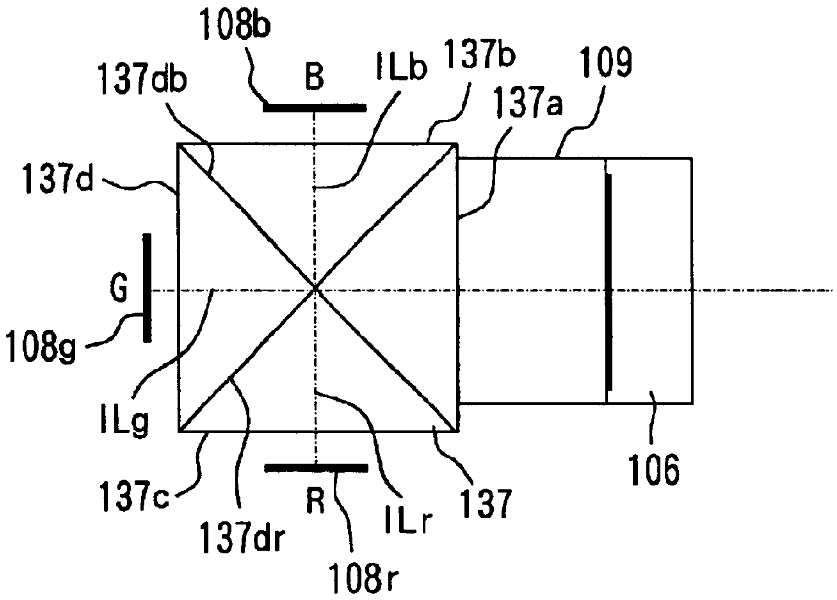

FIG. 10(A) shows the configuration of a projection type image display apparatus which is a further embodiment of the present invention. FIG. 10(B) shows part of an optical path prism 106 and a color separation/combination prism 137 from the direction indicated by an arrow K shown in FIG. 10(A).

The embodiment is the same as the embodiment in FIG. 7 except for the use of the color separation/combination prism 137 formed of integrally combined four prisms P1 to P4 such that its dichroic surfaces are crossed in the shape of a letter x. Thus, components identical to those in the embodiment in FIG. 7 are designated with the same reference numerals as those of the embodiment in FIG. 7, and description thereof is omitted.

The actions of the color separation/combination prism 137 in the embodiment are hereinafter described. In FIG. 10(B), of illumination light emitted from the optical path prism 106 and entering the color separation/combination prism 137 from a first surface 137*a*, light component of B reflected by a first dichroic surface 137*db* passes through a second surface 137*b* and reaches an image display element 108*b* for B.

The light component of R reflected by a second dichroic surface 137*dr* passes through a third surface 137*c* and reaches an image display element 108*r* for R.

The light component of G, passed through the first dichroic surface 137*db* and the second dichroic surface 137*dr*, passes through a fourth surface 137*d* and reaches an image display element 108*g* for G.

In the embodiment, like the previous embodiment, when the reference axes of the optical paths of the illumination optical system and the projection optical system color-separated by the color separation/combination prism 137 are defined as ILr, ILg, and ILb, respectively, these reference axes are not present in the plane of the sheet of FIG. 10(A) which includes the reference axis IL of the illumination optical system and the reference axis PL of the projection optical system emitted from the auxiliary prism, and the image display elements 108*r*, 108*b* for R, B are present outside the plane.

FIG. 11(A) shows the configuration of a projection type image display apparatus which is a yet further embodiment of the present invention. FIG. 11(B) shows part of an optical path prism 106 and a color separation/combination prism 147 from the direction indicated by an arrow K shown in FIG. 11(A).

The embodiment is the same as the aforementioned respective embodiments except for light traveling in the optical path prism 106. Thus, components identical to those in the embodiment in FIGS. 7(A) and (B) are designated with the same reference numerals as those of the embodiment in FIGS. 7(A) and (B), and description thereof is omitted.

In the embodiment, illumination light passing through a lens 105*b* first passes through an auxiliary prism 109 with refraction and then is incident on a first surface 106*b*' of the optical path prism 106, passes through a second surface 106*c*' and is incident on the color separation/combination prism 147.

In the color separation/combination prism 147, as in the embodiment of FIGS. 7(A) and (B), the light is separated into each color light component of R, G, and B which is incident on each of image display elements 108*r* to 108*b* where the light is modulated. The light is combined and then incident on the optical path prism 106 from the second surface 106*c*'.

The image light entering the optical path prism 106 is totally reflected by the first surface 106*b*', emits from a third surface 106*a*' and then is projected by an eccentric projection lens 110.

In the embodiment, the optical path prism 106 for transmitting the illumination light from the illumination optical system to the color separation/combination prism 147 and reflecting the image light from the color separation/combination prism 147 with a reflectivity of substantially 100% to transmit the reflected light to the eccentric projection lens 110 is provided between the illumination optical system and the color separation/combination prism 147 such that the optical path of the illumination light is different from the optical path of the image light in the optical path prism 106 and the color separation/combination prism 147. Thus, the optical path of the illumination light can be separated from the optical path of the image light without providing a polarization beam splitter as conventional. In addition, the optical path prism 106 can reflect the image light from the color separation/combination prism 147 with a reflectivity of substantially 100% to guide the reflected light to the eccentric projection lens 110.

Therefore, the use efficiency of light can be enhanced as compared with the conventional projection type image display apparatus to obtain bright display images.

In the embodiment, when the reference axes of the optical paths of the illumination optical system and the projection optical system color-separated by the color separation/combination prism 147 are defined as ILr, ILg, and ILb, respectively, these reference axes are not present in the plane of the sheet of FIG. 11(A) which includes the reference axis IL of the illumination optical system and the reference axis PL of the projection optical system, and the image display elements 108*r*, 108*b* for R, B are present outside the plane.

The color separation/combination prism 147 in the embodiment has a small third prism P3 for the image display element 108*g* for G which receives a small light flux in FIG. 11(A) to achieve a reduction in size of the apparatus. The optical effects thereof are the same as those of the embodiment in FIGS. 7(A) and (B).

Figure 12:
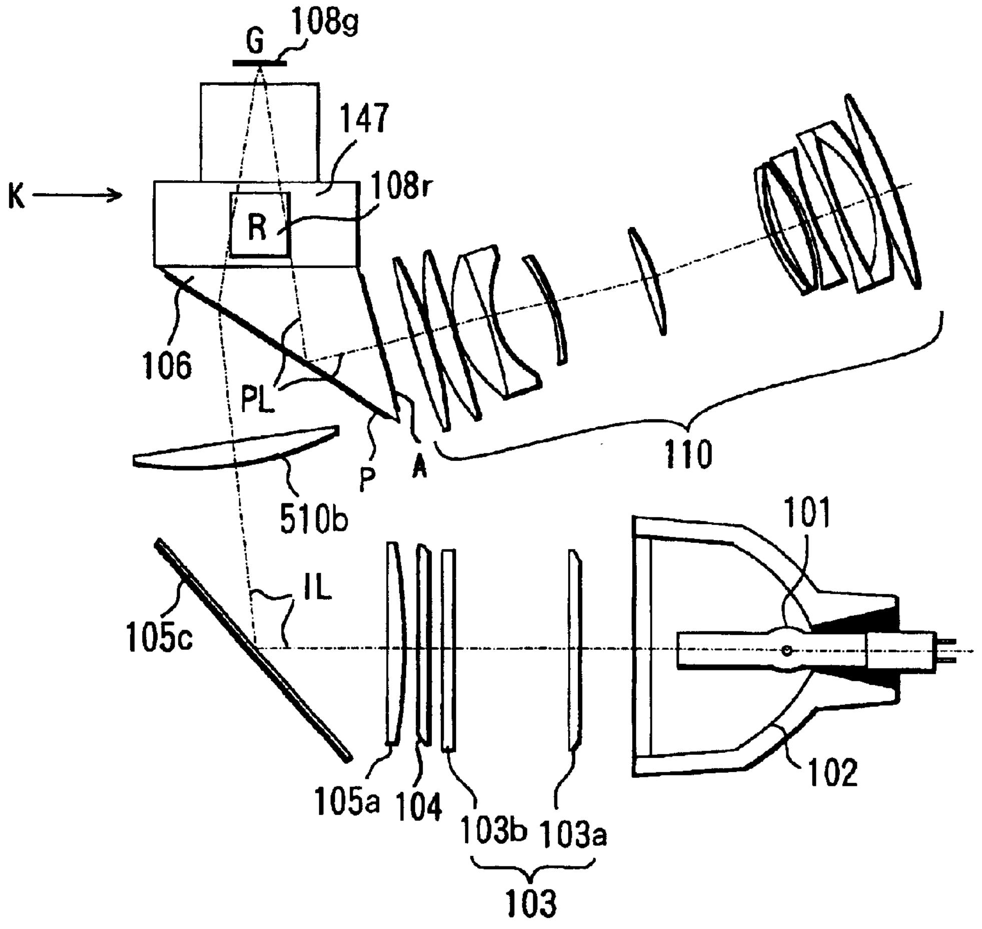
FIG. 12(A) shows the configuration of a projection type image display apparatus which is a still further embodiment of the present invention.
FIG. 12(B) is a diagram viewed from the direction indicated by an arrow K shown in FIG. 12(A)
Figure 12:
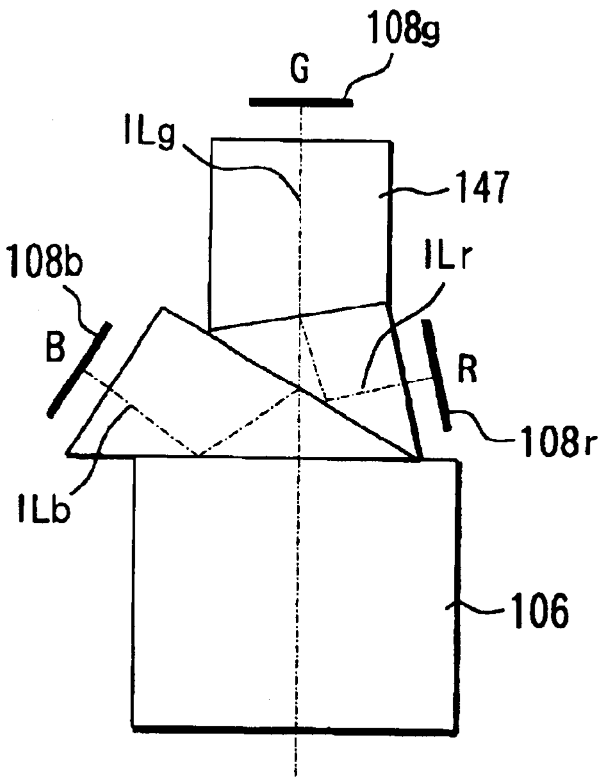

FIG. 12(A) shows the configuration of a projection type image display apparatus which is a still further embodiment of the present invention. FIG. 12(B) shows part of an optical path prism 106 and a color separation/combination prism 147 from the direction indicated by an arrow K shown in FIG. 12(A).

Figure 11:
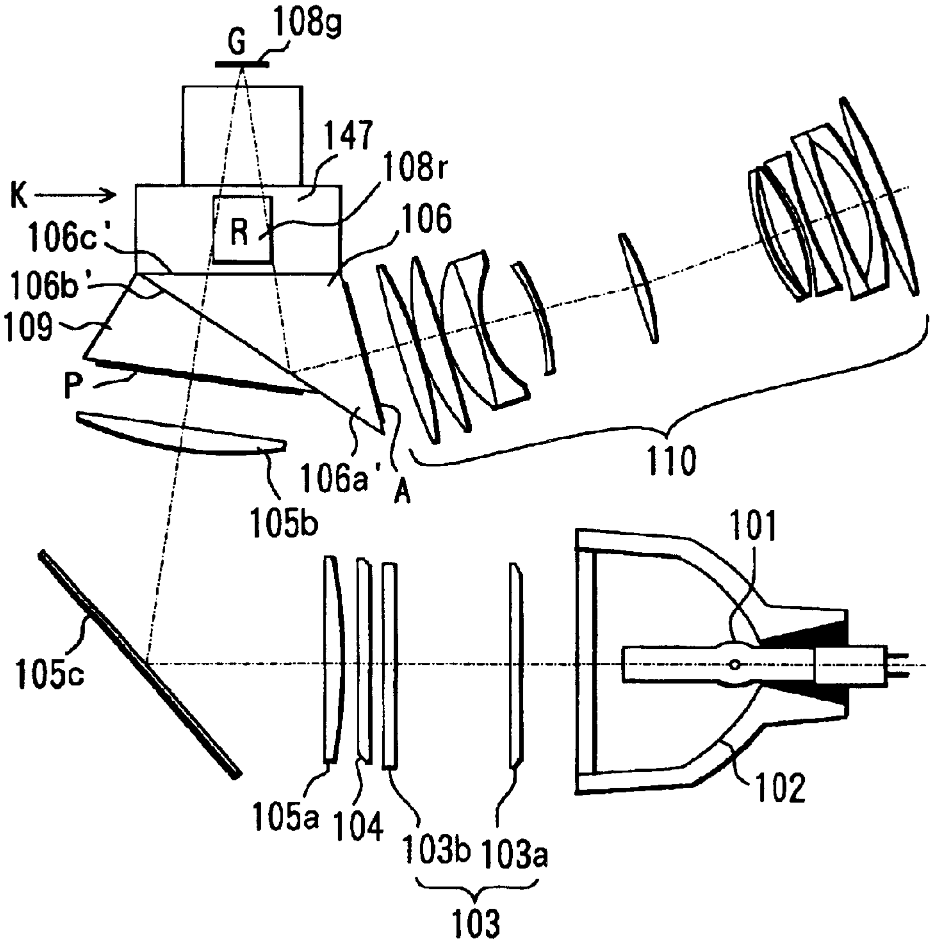
FIG. 11(A) shows the configuration of a projection type image display apparatus which is a yet further embodiment of the present invention.
FIG. 11(B) is a diagram viewed from the direction indicated by an arrow K shown in FIG. 11(A)
Figure 11:
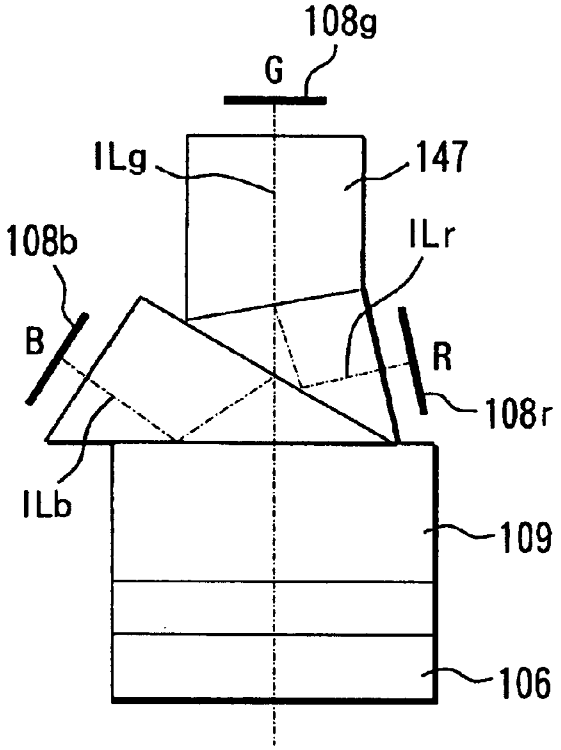

The embodiment is identical to the embodiment in FIG. 11 in traveling of illumination light, but has a configuration eliminating the auxiliary prism 109 shown in the embodiment of FIG. 11. In the embodiment, components identical to those in the embodiment in FIGS. 11(A) and (B) are designated with the same reference numerals as those of the embodiment in FIGS. 11(A) and (B), and description thereof is omitted.

As shown in the embodiment, the auxiliary prism is not necessarily provided in the present invention.

It should be noted that the arrangement of the image display elements for the respective color light components in the present invention is not limited to those described in the aforementioned respective embodiments, and may be arbitrarily designed.

In addition, the projection type image display apparatuses described in the aforementioned embodiments may be applied to an image display system which receives an image signal from an image recording apparatus, a computer or the like and projects an image onto a projection surface based on the image signal.

As described above, according to the embodiments shown in FIG. 7 to FIG. 12, the optical path of the illumination light can be separated from the optical path of the image light without providing a beam splitter as conventional. In addition, the light guide element reflects the illumination light from the illumination optical system or the image light from the color separation/combination optical system with a reflectivity of substantially 100% to guide the reflected light to the color separation/combination optical system or the projection optical system. Thus, the use efficiency of light can be enhanced as compared with the conventional projection type image display apparatus to obtain bright and high-definition display images.

At least one image display element disposed outside the plane including the reference axes of the illumination optical system and the projection optical system can reduce the size of the apparatus in the direction of that plane as compared with the placement of all the image display elements in the aforementioned plane.

Since the optical path of the illumination light and the optical path of the image light can be extended in the color separation/combination optical system in directions different from directions in which the optical paths are extended in separating the optical paths in the color separation/combination optical system, the respective optical systems can be more compact in size.

The reason can be explained as follows. When the optical paths are extended in the same plane, prisms corresponding to prisms P1 and P2 in FIG. 7 must be arranged in the plane across the illumination light path and the projection light path, but when not in the same plane (in planes orthogonal to each other), the illumination light path and the projection light path can be regarded as being at the same positions, and thus the prisms can be reduced in size since the prisms need not be arranged across the illumination light path and the projection light path present at different positions.

The projection optical system is configured as an eccentric optical system having at least one rotationally asymmetric surface or a plurality of optical elements with different rotational symmetry axes from one another, so that it is possible to correct eccentric aberration such as Keystone distortion caused by the inclination of the projection optical system.

When each reference axis on the side of the illumination light incident on each image display element and each reference axis on the side of image light emitted from each image display element are set to be inclined to the normal to the display surface of each image display element, the projection optical system can be reduced in size.

When the light guide element is formed in wedge shape, aberration produced in the wedge shape can be reduced by disposing the auxiliary optical element for refracting and transmitting the image light emitted from the light guide element between the light guide element and the projection optical system with an air gap between the auxiliary optical element and the light guide element, or by disposing the auxiliary optical element for refracting and transmitting the illumination light from the illumination optical system between the light guide element and the illumination optical system with an air gap between the auxiliary optical element and the light guide element.

Figure 13:
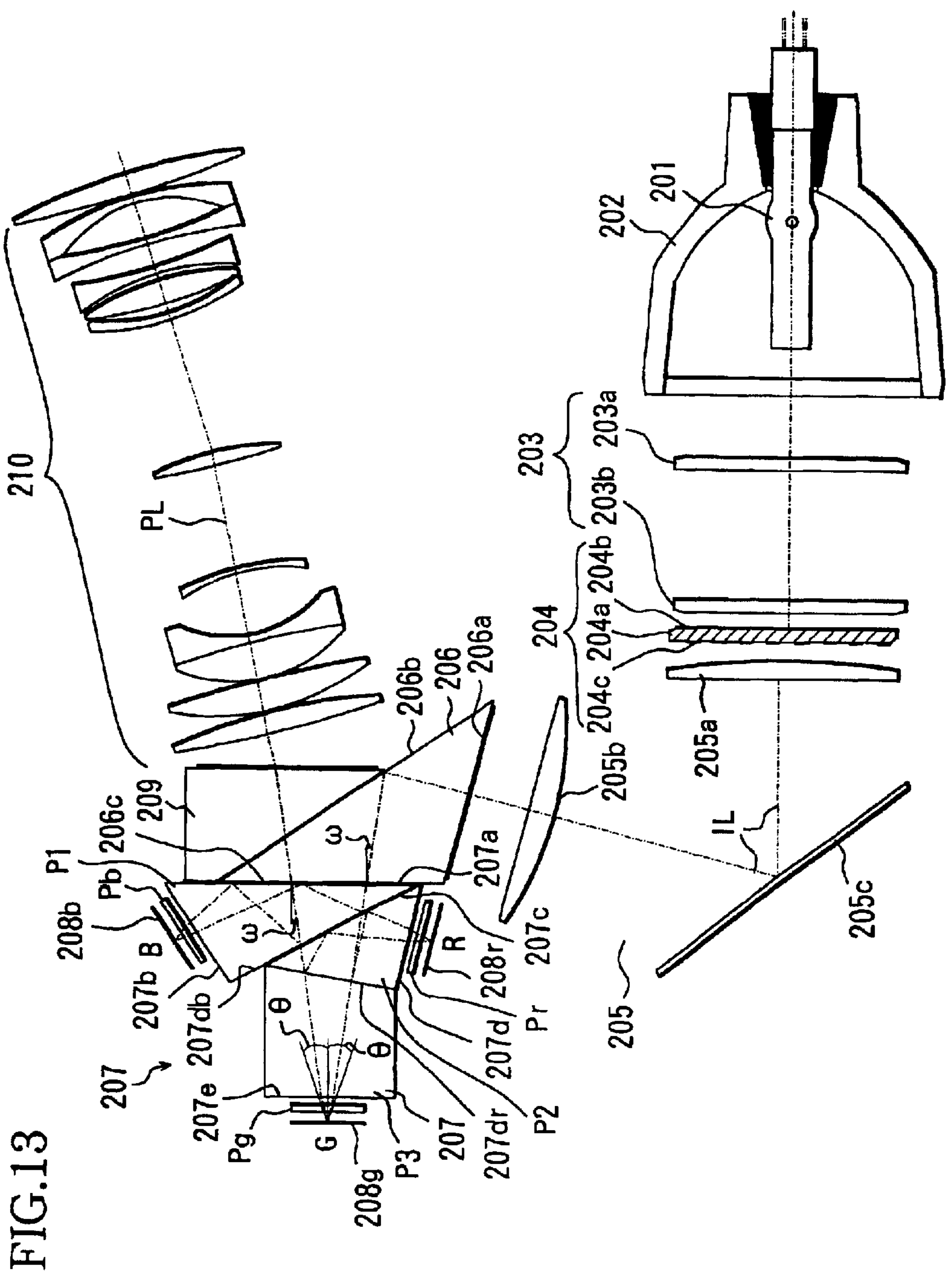
FIG. 13 shows the configuration of a projection type image display apparatus which is another embodiment of the present invention.

FIG. 13 shows the configuration of a projection type image display apparatus which is another embodiment of the present invention. In FIG. 13, reference numeral 201 shows an illumination light source formed of a high-pressure mercury-vapor lamp or the like, and reference numeral 202 shows a reflector for radiating light from the light source 201 in a predetermined direction.

Reference numeral 203 shows an integrator for forming a homogeneous illuminated area, and the integrator 203 is composed of fly eye lenses 203*a* and 203*b*.

Reference numeral 204 shows a polarization converting element for changing non-polarized light into light polarized in a predetermined direction. The element 204 is composed of a polarization separating film 204*a*, a reflection film 204*b*, and a ½ phase plate 204*c*.

Reference numeral 205 shows a light condensing optical system for condensing illumination light, and the optical system 205 is composed of lenses 205*a*, 205*b* and a mirror 205*c*. The light source 201 through the lens 205*b* constitute an illumination optical system.

Reference numeral 206 shows an optical path prism (light guide element) for setting optical paths such that optical paths of the illumination optical system and a projection optical system pass through a single color separation/combination optical system.

Reference numeral 207 shows a dichroic prism (color separation/combination optical element) for separating the optical path into three for three colors of R, G, and B and combining them. In the embodiment, the dichroic prism is formed by combining three prisms and forming dichroic films on predetermined bonding surfaces through evaporation or the like.

Reference numerals 208*r*, 208*g*, and 208*b* show reflection type image display elements for respective color light components, formed of liquid crystal displays or the like. Each of the elements 208*r*, 208*g*, and 208*b* is driven by a signal in accordance with image information from an image information supply apparatus such as a personal computer, a television, a VTR, and a DVD player, not shown, and reflects and modulates illumination light of each color incident thereon and then sends out the modulated light.

Reference numeral 209 shows an auxiliary prism (auxiliary optical element), and 210 an eccentric projection lens (projection optical system). Pr, Pg, and Pb show polarizing plates for the image display elements 208*r*, 208*g*, and 208*b*.

Next, the optical effects in the image display apparatus configured as above are described. An illumination light flux emitted radially from the light source 201 is reflected by the reflector 202 and collected toward the fly eye lens 203*a*. The illumination light flux is separated into a plurality of light fluxes by the fly eye lens 203*a* and then superimposed one another on the image display elements 208*r*, 208*g*, and 208*b* by the effects of the fly eye lens 203*b*, and the lenses 205*a*, 205*b* to form a homogeneous illuminated area on the image display elements.

A number of light fluxes emitted from the fly eye lens 203*b* are separated into P-polarized light and S-polarized light by the polarization separating film 204*a* corresponding to the respective light fluxes. The P-polarized light is converted to polarized light components in the same direction as the S-polarized light by the ½ phase plate 204*c*, while the S-polarized light is reflected by the reflection film 204*b* and radiated in the same direction as predetermined polarized light.

The illumination light flux is incident on the optical path prism 206 from a first surface 206*a* at an angle which satisfies total reflection conditions in a second surface 206*b*, and thus totally reflected. This achieves reflection with a reflectivity of substantially 100%. The light flux emits from a third surface 206*c* after the optical path thereof is turned.

While the embodiment is described for the total reflection of the illumination light on the second surface 206*b* of the optical path prism 206, the reflection on the second surface 206*b* may be attained by mirror coating formed in part of the outer side of the second surface 206*b* through evaporation or the like.

In the embodiment, a 3P(piece) prism formed of three prisms (first to third prisms P1 to P3) is used as the dichroic prism 207.

Light component of B (blue) incident on a first surface 207*a* of the first prism P1 is reflected by a first dichroic surface 207*db*, while light component of R (red) and light component of G (Green) pass through it.

The light component of B is reflected by the first surface 207*a* with a reflectivity of substantially 100% (that is, totally reflected) and then emits from a second surface 207*b* and reaches the image display element 208*b* for B.

The light component of R and the light component of G, which passed through the first dichroic surface 207*db*, are incident on a third surface 207*c* of the second prism P2 disposed with a slight air gap between itself and the surface 207*db*. The light component of R is reflected by a second dichroic surface 207*dr*, and the light component of G passes through it.

The light component of R is reflected by the third surface 207*c* with a reflectivity of substantially 100% (that is, totally reflected), and then emits from a fourth surface 207*d* and reaches the image display element 208*r* for R.

The light component of G, which passed through the second dichroic surface 207*dr*, is incident on the third prism P3, and then emits from a fifth surface 207*e* and reaches the image display element 208*g* for G.

In this manner, each color illumination light (each color light component) incident on each image display element is modulated in terms of polarization and reflected by each image display element driven by a signal in accordance with the aforementioned image information.

Image light modulated and reflected by each image display element is reflected in a direction different from the incident direction of the illumination light and incident on the dichroic prism 207, and combined into one and emits after passing through the optical surfaces in reverse order to that in the aforementioned color separation.

The light emitted from the dichroic prism 207 is incident on the optical path prism 206 from the third surface 206*c* at an angle smaller than the angle which satisfies the total reflection conditions in the second surface 206*b*, and passes through the second surface 206*b* and emits.

To reduce flare by the illumination light, antireflection films are formed on the emitting surface 206*c* of the optical path prism 206, the emitting surfaces 207*b*, 207*d*, 207*e* of the color separation/combination prism 207, and cover glass surfaces covering the light-receiving area of the image display elements 208*r*, 208*g*, 208*b*.

When the ratio (flare ratio) between the amount of flare light caused by the illumination light and the amount of image light is set to:

$$F \leqq 1/100 \qquad (2)$$

then antireflection films with a reflectivity of $Ri \leqq 0.33$ are formed on the emitting surface 206*c* of the optical path prism 206, the emitting surfaces 207*b*, 207*d*, 207*e* of the color separation/combination prism 207, and the cover glass surfaces of the image display elements 208*r*, 208*g*, 208*b*, respectively.

When the ratio between the flare light amount and the image light amount is set to $F \leqq 1/200$ . . . (3), antireflection films with a reflectivity of $Ri \leqq 0.16$ are formed on the emitting surface 206*c* of the optical path prism 206, the emitting surfaces 207*b*, 207*d*, 207*e* of the color separation/combination prism 207, and the cover glass surfaces of the image display elements 208*r*, 208*g*, 208*b*, respectively.

When the ratio between the flare light amount and the image light amount is set to $F \leqq 1/800$ . . . (4), antireflection films with a reflectivity of $Ri \leqq 0.041$ are formed on the emitting surface 206*c* of the optical path prism 206, the emitting surfaces 207*b*, 207*d*, 207*e* of the color separation/combination prism 207, and the cover glass surfaces of the image display elements 208*r*, 208*g*, 208*b*, respectively.

The light emitted from the optical path prism 206 passes through the auxiliary prism 209 with refraction, and is projected as a full color image on a screen (projection surface), not shown, by the eccentric projection lens 210 in FIG. 13.

In FIG. 13, when the reference axis of the illumination optical system is defined as the central axis of the illumination light flux, the reference axes of the optical systems can be considered as a straight line obtained by tracing the light ray along the optical axis of the reflector 202 to the subsequent components of the illumination optical system (205*a*, 205*b*, 205*c*) except for the fly eye lenses 203*a*, 203*b*, and the optical path prism 206, the dichroic prism 207, the image display elements 208*r* to 208*b*, the auxiliary prism 209, and the eccentric projection lens 210.

Based on this, IL is set as the reference axis of the illumination optical system and PL is set as the reference axis of the projection optical system in FIG. 13.

The polarizing plates Pr, Pg, Pb are provided between the color separation/combination prism 207 and the image display elements 208*r* to 208*b* and act both as polarizers for the illumination light and as analyzers for the projection system. Thus, light which is not modulated in the image display elements 208*r* to 208*b* (which emits in the same polarization direction as the polarization direction at the incidence) displays white, while light which is modulated and of which polarization direction is turned by 90 degrees displays black. In this event, the transmission directions of the polarizing plates Pr, Pg, Pb may be parallel with the polarization direction achieved by the polarization converting element, or may be different from the polarization direction achieved by the polarization converting element by providing a phase plate on the optical path after the color separation.

In the embodiment, the reference axis IL of the illumination optical system after the color separation and the reference axis PL of the projection optical system are set to be inclined at an angle of θ with respect to the normal line of the display surfaces of the image display elements 208*r* to 208*b*, respectively. Thus, the reference axis IL of the illumination optical system forms an angle of 2θ with the reference axis PL of the projection optical system.

When the aforementioned inclined angle θ is increased, the angle 2θ formed by the reference axis of the illumination light path with the reference axis of the projection light path is increased, and an angle ω of incidence of the image light (or illumination light) on the optical path prism 206 is reduced, so that it is possible to achieve more homogeneous transmittance at incident angles of all light rays passing through the optical path prism 206. In the illumination optical system, the efficiency becomes higher as the F number of the illumination optical system is smaller.

On the other hand, in the eccentric optical system, the amount of eccentric aberration is smaller as the inclined angle θ on the object plane (image display element) is smaller. As the F number of the eccentric projection lens 210 is larger, the aberration is more readily corrected.

As described above, in the embodiment, the optical path prism 206 for reflecting the illumination light from the illumination optical system with a reflectivity of substantially 100% to guide the reflected light to the dichroic prism 207 and transmitting the image light emitted from the dichroic prism 207 toward the eccentric projection lens 210 is provided between the illumination optical system and the dichroic prism 207 such that the optical path of the illumination light is different from the optical path of the image light in the optical path prism 206 and the dichroic prism 207. Thus, the optical path of the illumination light can be separated from the optical path of the image light without providing a polarization beam splitter as conventional. In addition, the optical path prism 206 can reflect the illumination light from the illumination optical system with a reflectivity of substantially 100% to guide the reflected light to the dichroic prism 207 and transmit the image light from the image display elements 208*r* to 208*b* toward the eccentric projection lens 210.

Therefore, the use efficiency of light can be enhanced as compared with the conventional projection type image display apparatus to obtain bright display images.

In the embodiment, the eccentric projection lens 210 is configured as an eccentric optical system having at least one rotationally asymmetric surface or a plurality of optical elements with different rotational symmetry axes from one another, so that it is possible to correct eccentric aberration such as Keystone distortion caused by the inclination of the reference axis of the projection optical system.

While the optical path prism 206 is formed in wedge shape in the embodiment, aberration produced in the wedge shape can be reduced since the auxiliary prism 209 is disposed between the optical path prism 206 and the eccentric projection lens 210 with an air gap between itself and the optical path prism 206 for refracting and transmitting the image light emitted from the optical path prism 206.

It should be noted that, as an alternative to the embodiment, it is possible that illumination light is directly incident on the second surface 206*b* of the optical path prism 206, passes through the third surface 206*c* and is incident on the color separation/combination prism 207, from which each modulated color light is again incident on the third surface 206*c* of the optical path prism 206 and totally reflected by the second surface 206*b*, emits from the first surface 206*a*, and then is projected by the eccentric projection lens 210.

Figure 14:
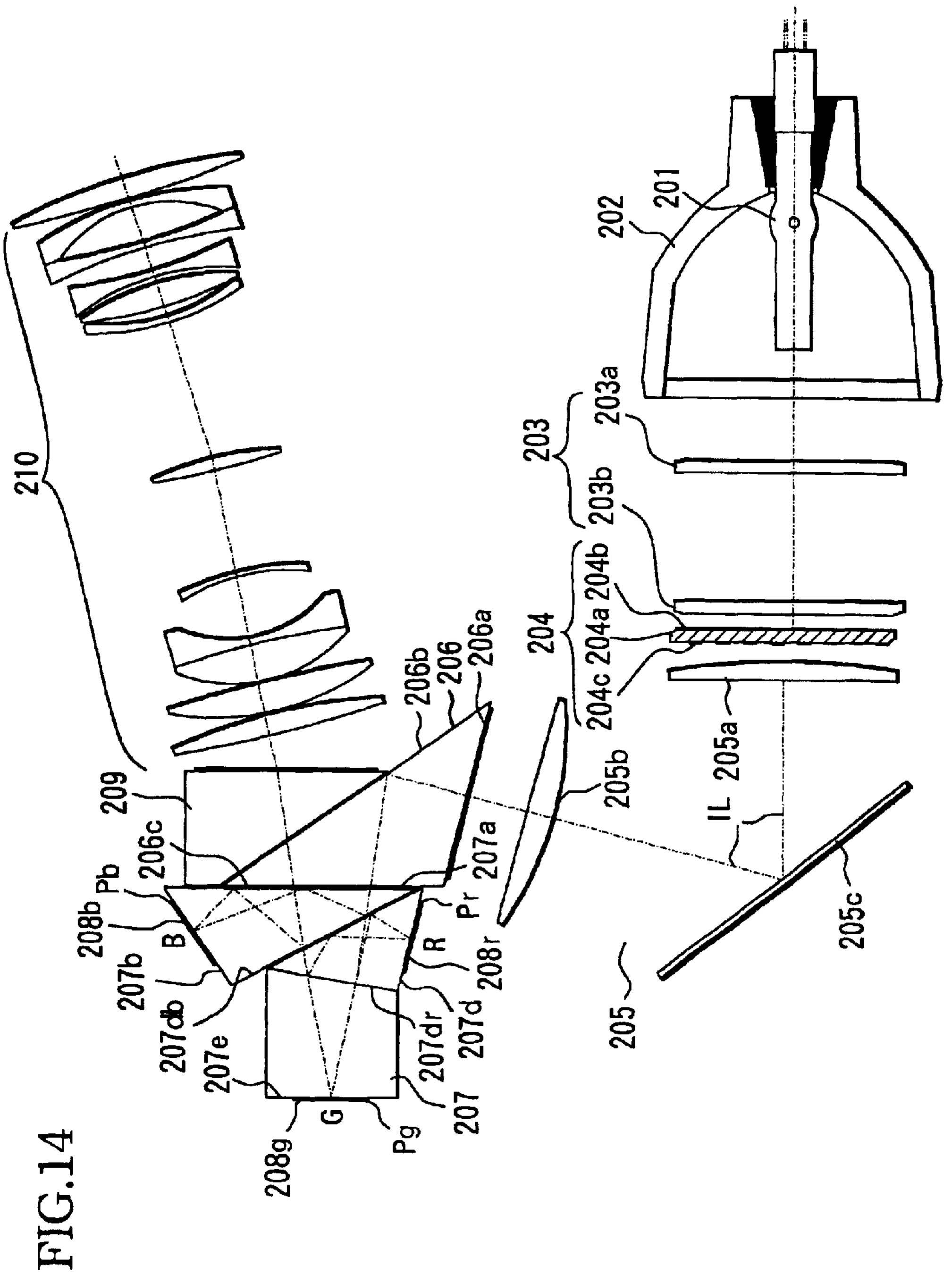
FIG. 14 shows the configuration of a projection type image display apparatus which is a yet another embodiment of the present invention.

FIG. 14 shows the configuration of a projection type image display apparatus which is a yet another embodiment of the present invention. The embodiment is a variation of the embodiment in FIG. 13, and components identical to those in the embodiment in FIG. 13 are designated with the same reference numerals as those of the embodiment in FIG. 13, and description thereof is omitted.

In the embodiment, emitting surfaces 207*b*, 207*d*, 207*e* of a color separation/combination prism 207 are bonded to image display elements 208*r*, 208*g*, 208*b*, respectively. In addition, an antireflection film is formed on an emitting surface 206*c* of an optical path prism 206 to suppress flare. In this event, when the ratio (flare ratio) between the amount of flare light caused by illumination light and the amount of image light is set to $F \leqq 1/100$ . . . (1), an antireflection film with a reflectivity of $Ri \leqq 1$ is formed on the emitting surface 206*c* of the optical path prism 206.

When the ratio between the flare light amount and the image light amount is set to $F \leqq 1/200$ . . . (3), an antireflection film with a reflectivity of $Ri \leqq 0.5$ is formed on the emitting surface 206*c* of the, optical path prism 206.

When the ratio between the flare light amount and the image light amount is set to $F \leqq 1/800$ . . . (4), an antireflection film with a reflectivity of $Ri \leqq 0.125$ is formed on the emitting surface 206*c* of the optical path prism 206.

As an alternative to the embodiment, it is possible that illumination light is directly incident on a second surface 206*b* of the optical path prism 206, passes through the third surface 206*c* and is incident on the color separation/combination prism 207, from which each modulated color light is again incident on the third surface 206*c* of the optical path prism 206 and totally reflected by the second surface 206*b*, emits from a first surface 206*a*, and then is projected by an eccentric projection lens 210.

Figure 15:
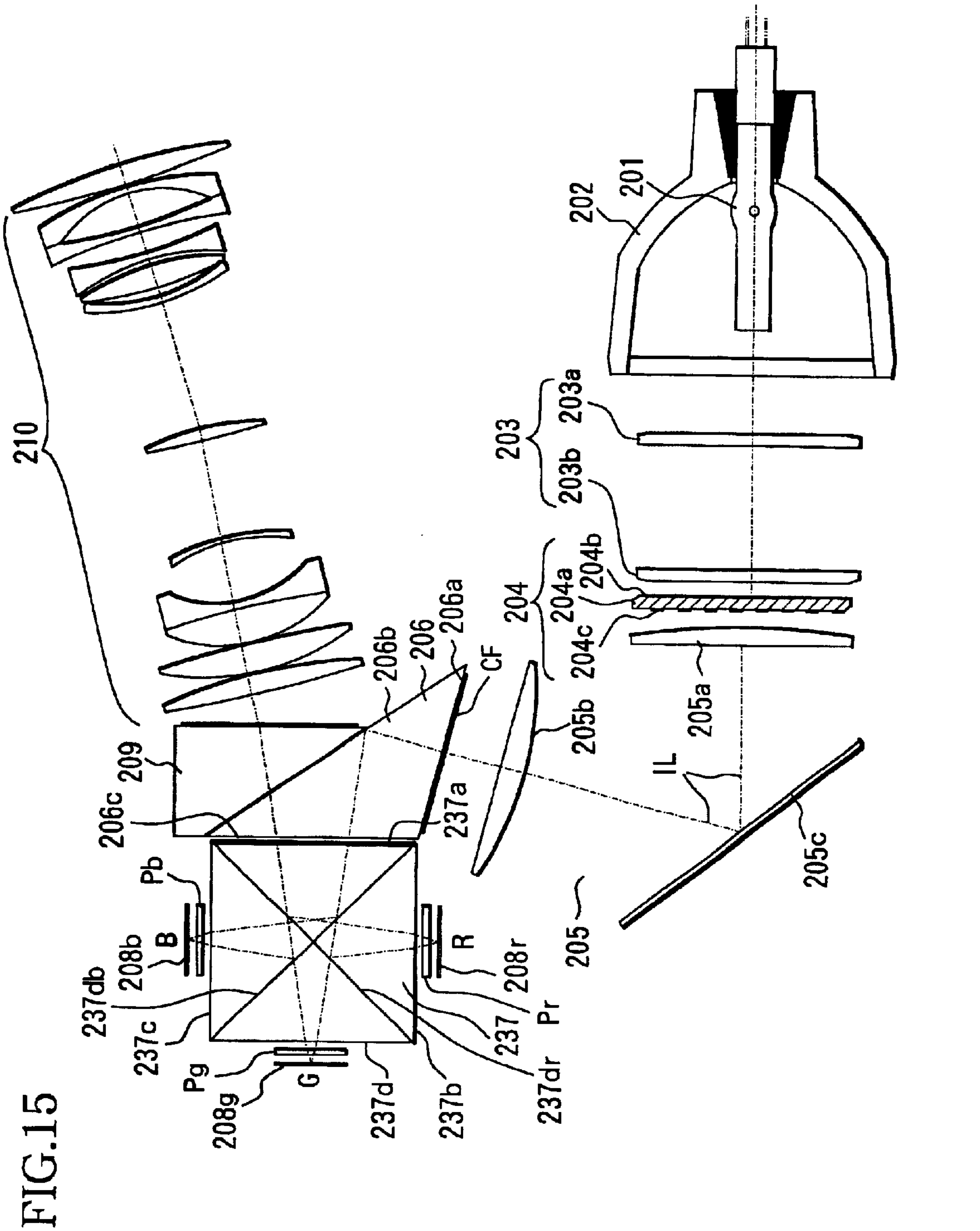
FIG. 15 shows the configuration of a projection type image display apparatus which is a further embodiment of the present invention.

FIG. 15 shows the configuration of a projection type image display apparatus which is a further embodiment of the present invention. In the embodiment, components identical to those in the embodiment in FIG. 13 are designated with the same reference numerals as those of the embodiment in FIG. 13, and description thereof is omitted.

In the embodiment, a color phase filter CF is provided for an illumination optical system for turning the polarization direction of light in a specific wavelength band by 90 degrees. In addition, the embodiment employs a color separation/combination prism 237 composed of four triangular prisms such that its dichroic surfaces are crossed in the shape of a letter x.

The optical effects of the color separation/combination prism 237 are described. In FIG. 15, of light incident on a first surface 237*a*, light reflected by a first dichroic surface 237*db* passes through a second surface 237*c* and a polarizing plate Pb and then reaches an image display element 208*b* for B.

Light reflected by a second dichroic surface 237*dr* passes through a third surface 237*b* and a polarizing plate Pr and then reaches an image display element 208*r* for R.

Light passing through the first dichroic surface 237*db* and the second dichroic surface 237*dr* passes through a fourth surface 237*d* and a polarizing plate Pg and then reaches an image display element 208*g* for G.

Figure 16:
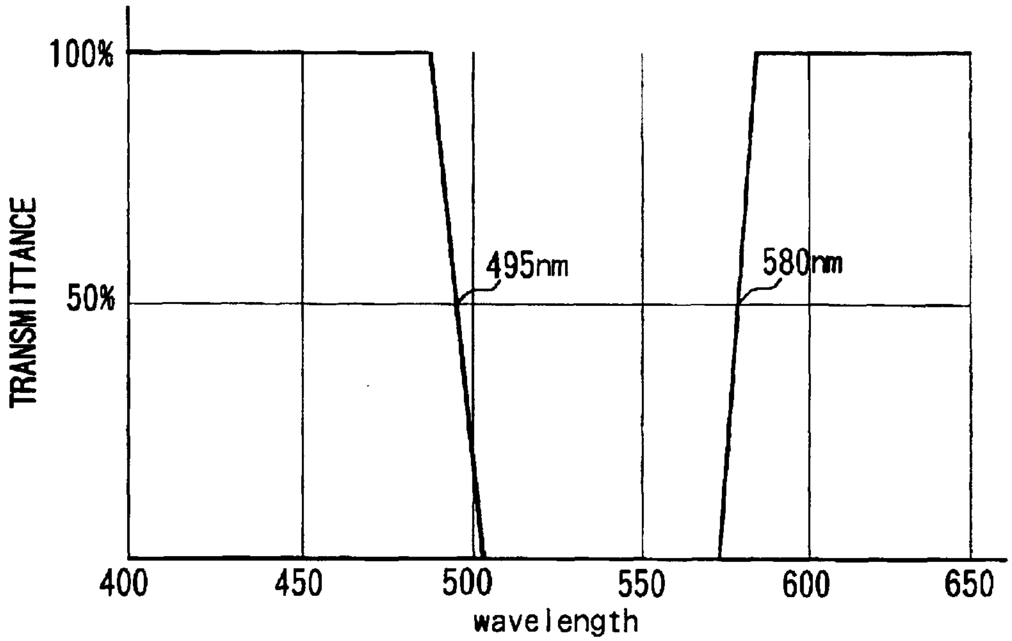
FIGS. 16(A) and 16(B) are graphs showing characteristics of a color phase filter used in the projection type image display apparatus shown in FIG. 15.
Figure 16:
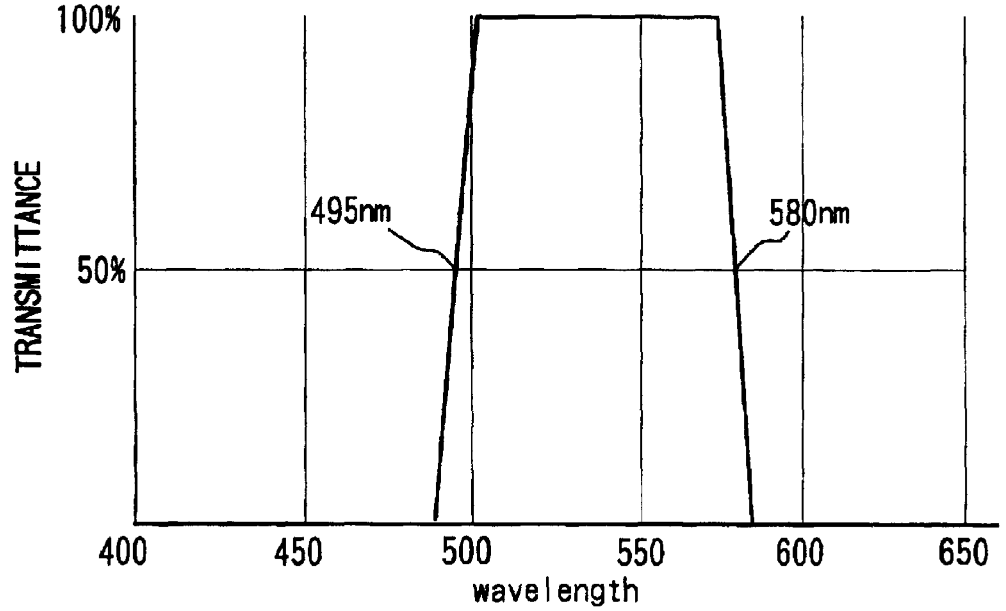

When light polarized in a direction is incident on the color phase filter CF, the polarization direction is turned by 90 degrees in a specific wavelength band (for example, the band for G), which is shown in FIGS. 16(A), 16(B).

FIG. 16(A) shows the intensity (transmittance) of polarized light components in parallel with the polarization direction of the incident light, while FIG. 16(B) shows the intensity (transmittance) of polarized light components perpendicular to the polarization direction of the incident light. Since light with the characteristics as shown in FIGS. 16(A), 16(B) emits from the color phase filter, the light component of G passing through the color separation/combination prism 237 has the polarization direction different in angle by 90 degrees from the polarization direction of the light component of R, B in the embodiment.

Figure 17:
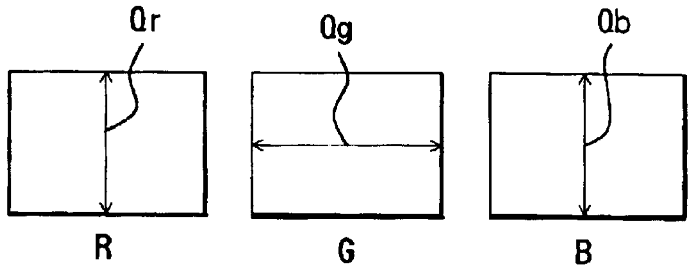
FIG. 17 is a schematic diagram for explaining transmission directions of polarizing plates used in the projection type image display apparatus shown in FIG. 15.

In this event, the transmission axis of the polarizing plate Pg provided on the optical path of the light component of G is different by 90 degrees from the transmission axes of the polarizing plates Pr, Pb provided on the optical paths of the light component of R, B as shown in FIG. 17 (the transmission axes are shown by arrows Qr, Qg, Qb in FIG. 17).

The polarization direction may be changed to a predetermined direction by providing a phase plate on the optical path of the light component of G or R, B.

As described above, the polarization direction of the light component of G is different by 90 degrees from the polarization directions of the light component of R, B to cause more P-polarized light to pass through the dichroic film forming part of the color separation/combination prism 237, thereby making it possible to enhance the efficiency in the dichroic film.

As a configuration different from the embodiment, it is possible that the color phase filter CF is provided between an optical path prism 206 and the color separation/combination prism 207 such that the respective color light components in the same polarization direction are transmitted and reflected in the optical path prism 206, and either P-polarized light components or S polarized light components are used for each color light in the color separation/combination prism 207.

When the color phase filter CF is used as described above, any configuration can have the effects herein shown as long as a color separating function is provided by using the color separation/combination prism formed of the 3P prism as shown in the embodiments of FIG. 13 and FIG. 14 as well as the color separation/combination prism formed of the cross prism shown in the embodiment of FIG. 15.

In addition, to reduce flare by the illumination light, antireflection films are formed on an emitting surface 206*c* of the optical path prism 206, the incident surfaces 237*a* of the color separation/combination prism 237, the emitting surfaces 237*b*, 237*c*, 237*d* of the color separation/combination prism 237, and cover glass surfaces of the image display elements 208*r*, 208*g*, 208*b*.

In this event, when the ratio (flare ratio) between the amount of flare light caused by illumination light and the amount of image light is set to $F \leqq 1/100$ . . . (2), antireflection films with a reflectivity of $Ri \leqq 0.25$ are formed on the emitting surface 206*c* of the optical path prism 206, the incident surfaces 237*a* of the color separation/combination prism 237, the emitting surfaces 237*b*, 237*c*, 237*d* of the color separation/combination prism 237, and cover glass surfaces of the image display elements 208*r*, 208*g*, 208*b*.

When the ratio between the flare light amount and the image light amount is set to $F \leqq 1/200$ . . . (3), antireflection films with a reflectivity of $Ri \leqq 0.125$ are formed on the emitting surface 206*c* of the optical path prism 206, the incident surfaces 237*a* of the color separation/combination prism 237, the emitting surfaces 237*b*, 237*c*, 237*d* of the color separation/combination prism 237, and cover glass surfaces of the image display elements 208*r*, 208*g*, 208*b*.

When the ratio between the flare light amount and the image light amount is set to $F \leqq 1/800$ . . . (4), antireflection films with a reflectivity of $Ri \leqq 0.031$ are formed on the emitting surface 206*c* of the optical path prism 206, the incident surfaces 237*a* of the color separation/combination prism 237, the emitting surfaces 237*b*, 237*c*, 237*d* of the color separation/combination prism 237, and cover glass surfaces of the image display elements 208*r*, 208*g*, 208*b*.

As an alternative to the embodiment, it is possible that illumination light is directly incident on a second surface 206*b* of the optical path prism 206, passes through the third surface 206*c* and is incident on the color separation/combination prism 237, from which each modulated color light is again incident on the third surface 206*c* of the optical path prism 206 and totally reflected by the second surface 206*b*, emits from a first surface 206*a*, and then is projected by an eccentric projection lens 210.

Figure 18:
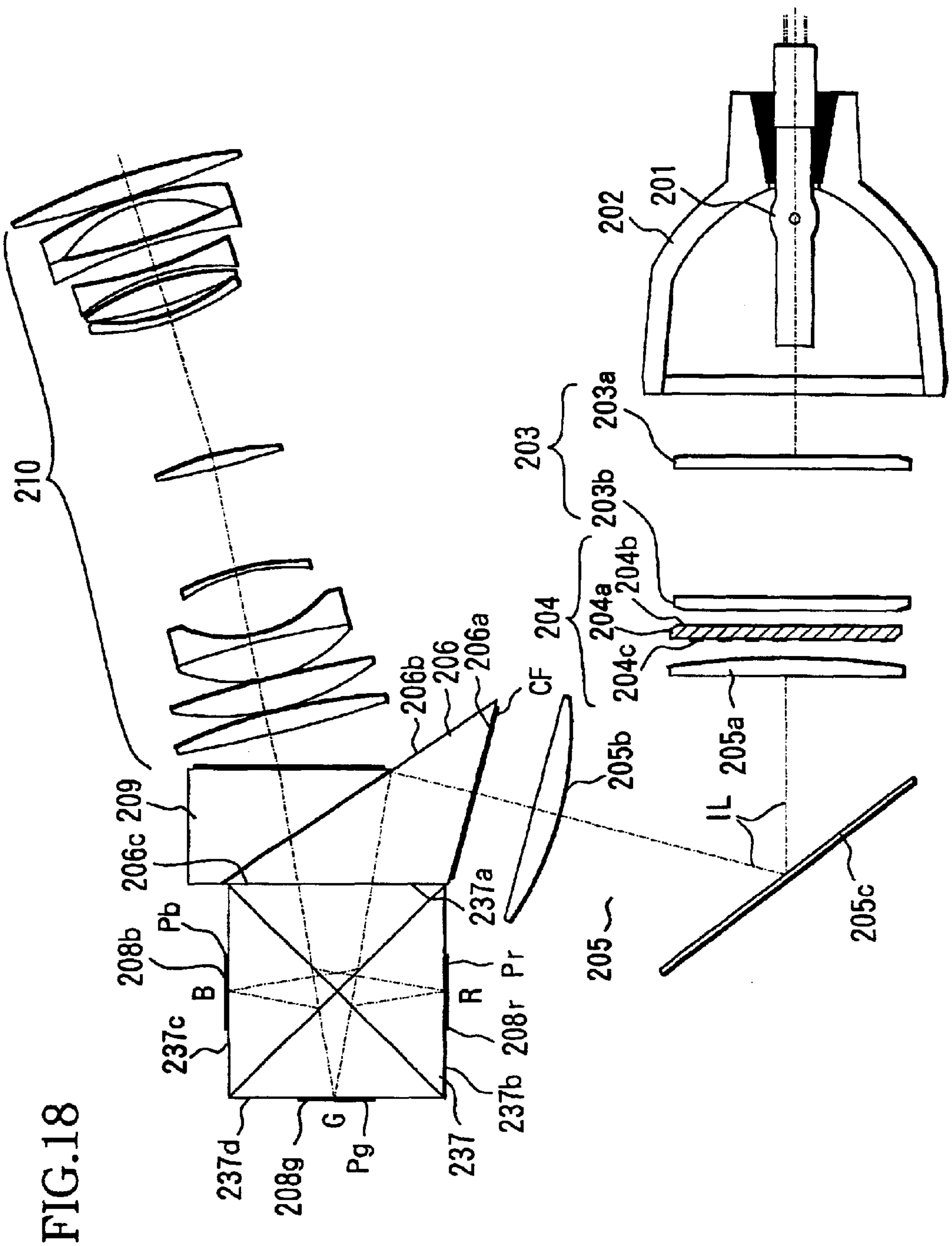
FIG. 18 shows the configuration of a projection type image display apparatus which is a yet further embodiment of the present invention.

FIG. 18 shows the configuration of a projection type image display apparatus which is a yet further embodiment of the present invention. The embodiment is a variation of the embodiment in FIG. 15, and components identical to those in the embodiment in FIG. 15 are designated with the same reference numerals as those of the embodiment in FIG. 15, and description thereof is omitted.

In the embodiment, an emitting surfaces 206*c* of an optical path prism 206 is bonded to an incident surface 237*a* of a color separation/combination prism 237. In addition, emitting surfaces 237*b*, 237*c*, 237*d* of the color separation/combination prism 237 are bonded to image display elements 208*r*, 208*g*, 208*b*, respectively. This can prevent occurrence of flare light produced by illumination optical.

As an alternative to the embodiment, it is possible that illumination light is directly incident on a second surface 206*b* of the optical path prism 206, passes through the third surface 206*c* and is incident on the color separation/combination prism 237, from which each modulated color light is again incident on the third surface 206*c* of the optical path prism 206 and totally reflected by the second surface 206*b*, emits from a first surface 206*a*, and then is projected by an eccentric projection lens 210.

Figure 19:
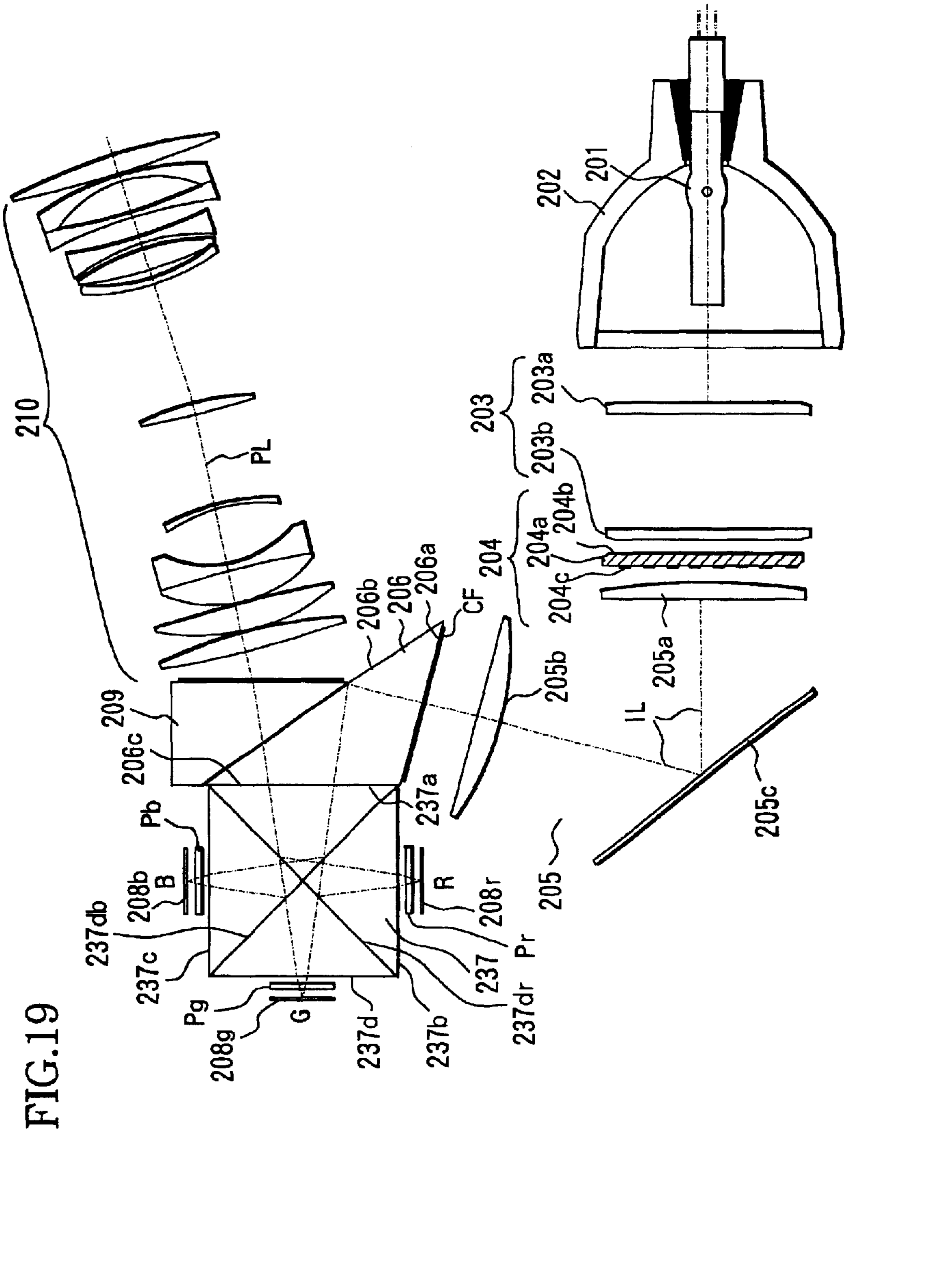
FIG. 19 shows the configuration of a projection type image display apparatus which is a still further embodiment of the present invention.

FIG. 19 shows the configuration of a projection type image display apparatus which is a still further embodiment of the present invention. The embodiment is a variation of the embodiment in FIG. 15, and components identical to those in the embodiment in FIG. 15 are designated with the same reference numerals as those of the embodiment in FIG. 15, and description thereof is omitted.

In the embodiment, an emitting surfaces 206*c* of an optical path prism 206 is bonded to an incident surface 237*a* of a color separation/combination prism 237. In addition, antireflection films are formed on emitting surfaces 237*b*, 237*c*, 237*d* of the color separation/combination prism 237 and cover glass surfaces of image display elements 208*r*, 208*g*, 208*b*.

In this event, when the ratio (flare ratio) between the amount of flare light caused by illumination light and the amount of image light is set to $F \leqq 1/100$ . . . (2), antireflection films with a reflectivity of $Ri \leqq 0.5$ are formed on the emitting surfaces 237*b*, 237*c*, 237*d* of the color separation/combination prism 237 and the cover glass surfaces of the image display elements 208*r*, 208*g*, 208*b*.

When the ratio between the flare light amount and the image light amount is set to $F \leqq 1/200$ . . . (3), antireflection films with a reflectivity of $Ri \leqq 0.25$ are formed on the emitting surfaces 237*b*, 237*c*, 237*d* of the color separation/combination prism 237 and the cover glass surfaces of the image display elements 208*r*, 208*g*, 208*b*.

When the ratio between the flare light amount and the image light amount is set to $F \leqq 1/800$ . . . (4), antireflection films with a reflectivity of $Ri \leqq 0.125$ are formed on the emitting surfaces 237*b*, 237*c*, 237*d* of the color separation/combination prism 237 and the cover glass surfaces of the image display elements 208*r*, 208*g*, 208*b*.

As an alternative to the embodiment, it is possible that illumination light is directly incident on a second surface 206*b* of the optical path prism 206, passes through the third surface 206*c* and is incident on the color separation/combination prism 237, from which each modulated color light is again incident on the third surface 206*c* of the optical path prism 206 and totally reflected by the second surface 206*b*, emits from a first surface 206*a*, and then is projected by an eccentric projection lens 210.

Figure 20:
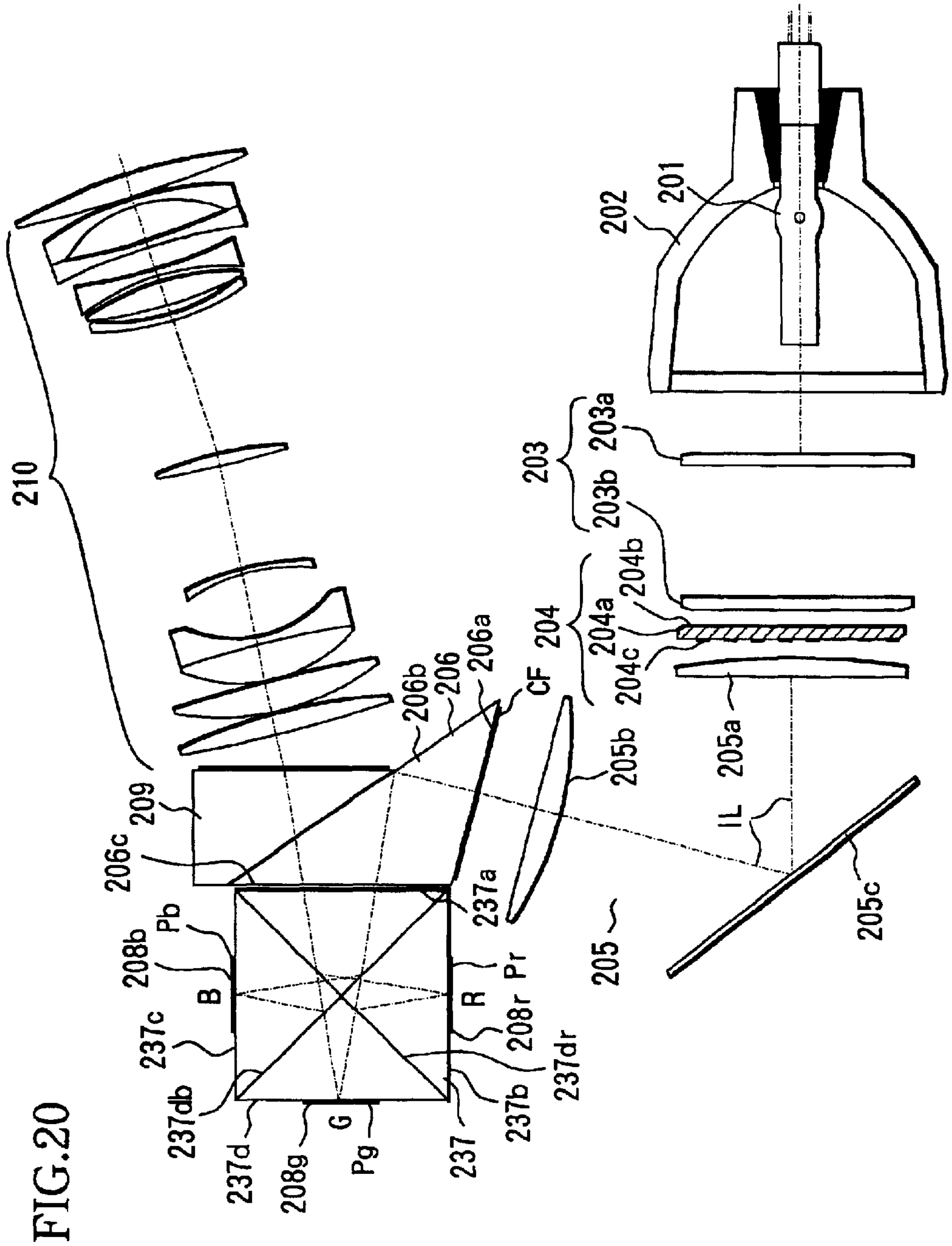
FIG. 20 shows the configuration of a projection type image display apparatus which is another embodiment of the present invention.
Figure 21:
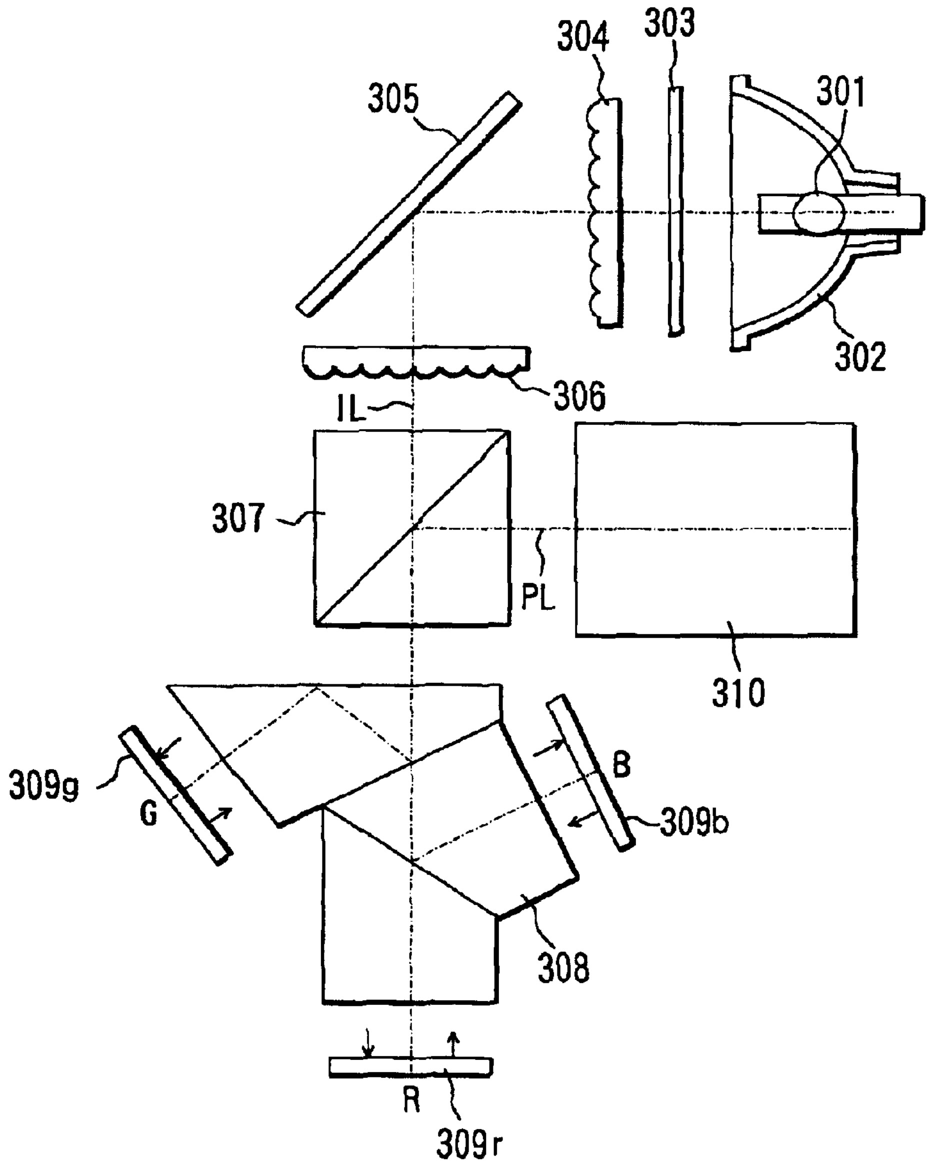
FIG. 21 shows the configuration of a conventional projection type image display apparatus.

FIG. 20 shows the configuration of a projection type image display apparatus which is another embodiment of the present invention. The embodiment is a variation of the embodiment in FIG. 18, and components identical to those in the embodiment in FIG. 18 are designated with the same reference numerals as those of the embodiment in FIG. 18, and description thereof is omitted.

In the embodiment, antireflection films are formed on an emitting surface 206*c* of an optical path prism 206 and an incident surface 237*a* of a color separation/combination prism 237. In addition, emitting surfaces 237*b*, 237*c*, 237*c* of the color separation/combination prism 237 are bonded to image display elements 208*r*, 208*g*, 208*b*.

In this event, when the ratio (flare ratio) between the amount of flare light caused by illumination light and the amount of image light is set to $F \leqq 1/100$ . . . (2), antireflection films with a reflectivity of $Ri \leqq 0.5$ are formed on the emitting surface 206*c* of the optical path prism 206 and the incident surface 237*a* of the color separation/combination prism 237.

When the ratio between the flare light amount and the image light amount is set to F≦1/200 . . . (3), antireflection films with a reflectivity of Ri≦0.25 are formed on the emitting surface 206*c* of the optical path prism 206 and the incident surface 237*a* of the color separation/combination prism 237.

When the ratio between the flare light amount and the image light amount is set to F≦1/800 . . . (4), antireflection films with a reflectivity of Ri≦0.125 are formed on the emitting surface 206*c* of the optical path prism 206 and the incident surface 237*a* of the color separation/combination prism 237.

As an alternative to the embodiment, it is possible that illumination light is directly incident on a second surface 206*b* of the optical path prism 206, passes through the third surface 206*c* and is incident on the color separation/combination prism 237, from which each modulated color light is again incident on the third surface 206*c* of the optical path prism 206 and totally reflected by the second surface 206*b*, emits from a first surface 206*a*, and then is projected by an eccentric projection lens 210.

As described above, according to the embodiments shown in FIGS. 13 to 20, the antireflection film is formed on the surface through which both the illumination light and the image light pass in at least one of the light guide element and the color separation/combination optical element, so that it is possible to reduce flare caused by the illumination light. The antireflection film, when formed on the glass surfaces of the image display elements, is more advantageous in reducing flare.

It is preferable that the value obtained by dividing the sum of the reflectivities in the wavelength range for blue of 400 to 490 nm weighted by the spectral light efficiencies at respective wavelengths by the sum of the spectral light efficiencies satisfies the respective conditions (2) to (4) of the reflectivity Ri, the value obtained by dividing the sum of the reflectivities in the wavelength range for green of 500 to 580 nm weighted by the spectral light efficiencies at respective wavelengths by the sum of the spectral light efficiencies satisfies the respective conditions (2) to (4) of the reflectivity Ri, and the value obtained by dividing the sum of the reflectivities in the wavelength range for red of 590 to 700 nm weighted by the spectral light efficiencies at respective wavelengths by the sum of the spectral light efficiencies satisfies the respective conditions (2) to (4) of the reflectivity Ri.

Since the image display elements modulate the polarization of light, the illumination optical system and the projection optical system requires a polarizing plate for displaying images. The polarizing plate provided between the color separation/combination optical element and the image display elements can eliminate influences of internal strain in the optical elements (light guide element, the color separation/combination optical system) in which the illumination light path and the image (projection) light path overlap and instable polarization in an optical multilayer film, leading to an improved image contrast.

The optical path of the illumination light can be separated from the optical path of the image light without providing a polarization beam splitter as conventional. In addition, since the light guide element reflects the illumination light from the illumination optical system or the image light from the color separation/combination optical system with a reflectivity of substantially 100% to guide the reflected light to the color separation/combination optical system or the projection optical system, the use efficiency of light can be enhanced as compared with the conventional projection type image display apparatus to obtain bright and high-definition display images. Furthermore, when the projection optical system is configured as the eccentric optical system, it is possible to correct eccentric aberration such as Keystone distortion caused by the inclination of the projection optical system.

When each reference axis on the side of the illumination light incident on each image display element and each reference axis on the side of the image light emitted from each image display element are set to be inclined to the normal to the display surface of each image display element, the projection optical system can be reduced in size.

When the light guide element is bonded to the color separation/combination optical element or the color separation/combination optical element is bonded to the image display elements, flare produced from the illumination light can be more effectively suppressed.

The arrangement of the image display elements for the respective colors is not limited to the arrangements in the respective aforementioned embodiments, and may be arbitrarily designed.

While preferred embodiments have been described, it is to be understood that modification and variation of the present invention may be made without departing from the sprit or scope of the following claims.

What is claimed is:

1. An image display optical system comprising:

an illumination optical system;

a plurality of image display elements, which modulate light incident thereon to emit image light;

a color separationlcombination optical system which separates illumination light from said illumination optical system into a plurality of color components of the illumination light to cause the separated light to be incident on said plurality of image display elements and combines the image light emitted from each of said plurality of image display elements;

a projection optical system which projects the image light combined by said color separation/combination optical system onto a projection surface; and a light guide element which is disposed between said illumination optical system and said color separation/combination optical system, reflects the illumination light from said illumination optical system with a reflectivity of substantially 100% to guide the reflected light to said color separation/combination optical system and transmits the image light from said color separation/combination optical system to said projection optical system, wherein each optical path of the illumination light and each optical path of the mage light are different from each other in said light guide element and said color separation/combination optical system, and said projection optical system is an eccentric optical system.

2. The image display optical system according to claim 1, wherein said projection optical system has at least one rotationally asymmetric surface.

3. The image display optical system according to claim 1, wherein said projection optical system has a plurality of optical elements having different rotational symmetry axes.

4. The image display optical system according to claim 1, further comprising an auxiliary optical element which is disposed between said light guide element and said projection optical system with an air gap between said auxiliary optical element and said light guide element, and refracts and transmits the image light from said light guide element.

5. The image display optical system according to claim 1, further comprising an auxiliary optical element which is disposed between said light guide element and said illumination optical system with an air gap between said auxiliary optical element and said light guide element and refracts and transmits the illumination light from said illumination optical system.

6. A projection type image display apparatus comprising:
said image display optical system according to claim 1, wherein original images displayed on said image display elements are enlargedly projected onto said projection surface through said image display optical system.

7. An image display optical system comprising:
an illumination optical system;
a plurality of image display elements, which modulate light incident thereon to emit image light;
a color separation/combination optical system which separates illumination light from said illumination optical system into a plurality of color components of the illumination light to cause the separated light to be incident on said plurality of image display elements and combines the image light emitted from each of said plurality of image display elements;
a projection optical system which projects the image light combined by said color separation/combination optical system onto a projection surface; and
a light guide element which is disposed between said illumination optical systm and said color separation/combination optical system, reflects the illumination light from said illumination optical system with a reflectivity of substantially 100% to guide the reflected light to said color separation/combination optical system and transmits the image light from said color separation/combination optical system to said projection optical system,
wherein each reference axis on the side of the side of the illumination light incident on each of said image display elements and each reference axis on the side of the image light emitted from each of said image display elements are inclined with respect to a normal line of a display surface of each of said image display elements, said reference axis referring to a line obtained by tracing a light ray along a center line of an illumination light flux in said illumination optical system to said light guide element, said color separation/combination optical system, and said projection optical system, and said projection optical system is an eccentric optical system.

8. The image display optical system according to claim 7, wherein said projection optical system has at least one rotationally asymmetric surface.

9. The image display optical system according to claim 7, wherein said projection optical system has a plurality of optical elements having different rotational symmetry axes.

10. The image display optical system according to claim 7, further comprising an auxiliary optical element which is disposed between said light guide element and said projection optical system with an air gap between said auxiliary optical element and said light guide element, and refracts and transmits the image light from said light guide element.

11. The image display optical system according to claim 7, further comprising an auxiliary optical element which is disposed between said light guide element and said illumination optical system with an air gap between said auxiliary optical element and said light guide elemeuz, and refracts and transmits the illumination light from said illumination optical system.

12. The image display optical system according to claim 7, wherein the following condition is satisfied:

$$7<FNO/\tan\theta<46$$

where θ represents an angle formed by each said reference axis of the illumination light and each said reference axis of the image light with the normal line of the display surface of each said image display element and FNO represents an F rnmiber of said illumination optical system with respect to said image display elements.

13. A projection type image display apparatus comprising:
the image display optical system according to claim 7, wherein original images displayed on said image display elements are enlargedly projected onto said projection surface through said image display optical system.

14. An image display optical system comprising:
an illumination optical system;
a plurality of image display elements, which modulate light incident thereon to emit image light;
a color separation/combination optical system which separates illumination light from said illumination optical system into a plurality of color components of the illumination light to cause the separated light to be incident on said plurality of image display elements and combines the image light emitted from each of said plurality of image display elements;
a projection optical system which projects the image light combined by said color separation/combination optical system onto a projection surface; and
a light guide element which is disposed between said illumination optical system and said color separation/combination optical system, transmits the illumination light from said illumination optical system to said color separation/combination optical system and reflects the image light from said color separation/combination optical system with a reflectivity of substantially 100% to guide the reflected light to said projection optical system,
wherein each optical path of the illumination light and each optical path of the image light are different from each other in said light guide elementand said color separation/combination optical system, and said projection optical system is an eccentric optical system.

15. The image display optical system according to claim 14, wherein said projection optical system has at least one rotationally asymmetric surface.

16. The image display optical system according to claim 14, wherein said projection optical system has a plurality of optical elements having different rotational symmetry axes.

17. The image display optical system according to claim 14, further comprising an auxiliary optical element which is disposed between said light guide element and said projection optical system with an air gap between said auxiliary optical element and said light guide element, and refracts and transmits the image light from said light guide element.

18. The image display optical system according to claim 14, further comprising an auxiliary optical element which is disposed between said light guide element and said illumination optical system with an air gap between said auxiliary optical element and said light guide element, and refracts and transmits the illumination light from said illumination optical system.

19. A projection type image display apparatus comprising:

the image display optical system according to claim 14, wherein original images displayed on said image display elements are enlargedly projected onto said projection surface through said image display optical system.

20. An image display optical system comprising:

an illumination optical system;

a plurality of image display elements, which modulafe light incident thereon to emit image light;

a color separation/combination optical system which separates illumination light from said illumination optical system into a plurality of color components of the illumination light to cause the separated light to be incident on said plurality of image display elements and combines the image light emitted from each of said plurality of image display elements;

a projection optical system which projects the image light combined by said color separation/combination optical system onto a projection surface; and a light guide element which is disposed between said illumination optical system and said color separation/combination optical system, transmits the illumination light from said illumination optical system to said color separation/combination optical system and reflects the image light from said color separation/combination optical system with a reflectivity of substantially 100% to guide the reflected light to said projection optical system, wherein each reference axis on the side of the illumination light incident on each of said image display elements and each reference axis on the side of the image light emitted from each of said image display elements are inclined with respect to a normal line of a display surface of each of said image display elements, said reference axis refening to a line obtained by tracing a light ray along a center line of an illumination light flux in said illumination optical system to said light guide element, said color separation/combination optical system, and said projection optical system, and said projection optical system is an eccentric optical system.

21. The image display optical system according to claim 20, wherein said projection optical system has at least one rotationally asymmetric surface.

22. The image display optical system according to claim 20, wherein said projection optical system has a plurality of optical elements having different rotational symmetry axes.

23. The image display optical system according to claim 20, further comprising an auxiliary optical element which is disposed between said light guide element and said projection optical system with an air gap between said auxiliary optical element and said light guide element, and refracts and transmits the image light from said light guide element.

24. The image display optical system according to claim 20, further comprising an auxiliary optical element which is disposed between said light guide element and said illumination optical system with an air gap between said auxiliary optical element and said light guide element, and refracts and transmits the illumination light from said illumination optical system.

25. The image display optical system according to claim 20, wherein the following condition is satisfied:

$$7<FNO/\tan\theta<46$$

where θ represents an angle formed by each said reference axis of the illumination light and each said reference axis of the image light with the normal line of the display surface of each said image display element and FNO represents an F number of said illumination optical system with respect to said image display elements.

26. A projection type image display apparatus comprising the image display optical system according to claim 20, wherein original images displayed on said image display elements are enlargedly projected onto said projection surface through said image display optical system.

27. An image display optical system comprising:

an illumination optical system;

a reflection type image display element which reflects illumination light from said illumination optical system and modulates the illumination light to emit image light; and a projection optical system which projects the image light emitted from said image display element onto a projection surface;

wherein the following condition is satisfied:

$$7<FNO/\tan\theta<46$$

where θ represents an angle formed by a reference axis on the side of the illumination light incident on said image display element and a reference axis of the image light emitted from said image display element with a normal line of a display surface of said image display element, said reference axis referring to a line obtained by tracing a light ray along a center line of an illumination light flux in said illumination optical system to said illumination optical system and said projection optical system, and FNO represents an F number of said illumination optical system with respect to said image display element.

28. The image display optical system according to claim 27, further comprising:

a plurality of said reflection type image display elements; and a color separation/combination optical system which separates the illumination light from said illumination optical system into a plurality of color components of the illumination light to cause the separated light to be incident on said plurality of reflectiom type image display elements and combines the image light emitted from each of said plurality of image display elements to cause said combined light to be incident on said projection optical system.

29. A projection type image display apparatus comprising:

the image display optical system according to claim 27, wherein original images displayed on said image display elements are enlargedly projected onto said projection saxface through said image display optical system.

30. An image display optical system comprising:

an illumination optical system;

a plurality of image display elements, which modulate light incident thereon to emit image light;

a color separation/combiflation optical system which separates illumination light from said illumination optical system into a plurality of color components of the illumination light to cause the separated light to be incident on said plurality of image display elements and combines the image emitted from each of said plurality of image display elements;

a projection optical system which projects the image light combined by said color separation/combination optical system onto a projection surface; and a light guide element which is disposed between said illumination optical system and said color separation/combination optical system, reflects the illumination light from said illumination optical system with a reflectivity of substantially 100% to guide the reflected light to said color separation/combination optical system and transmits the image light from said color separation/combination optical system to said projection optical system, wherein each optical path of the illumination light and each optical path of the image light are different from each other in said light guide element and said color separation/combination optical system, at least one of said plurality of image display elements is disposed outside a plane including a reference axis of said illumination optical system and a reference axis of said projection optical system, said reference axis referring to a line obtained by tracing a light ray along a center line of an illumination light flux in said illumination optical system to said light guide element, said color separation/combination optical system, and said projection optical system, and said projection optical system is an eccentric optical system.

31. The image display optical system according to claim 30, wherein said projection optical system has at least one rotationally asymmetric surface.

32. The image display optical system according to claim 30, wherein said projection optical system has a plurality of optical elements having different rotational symmetly axes.

33. The image display optical system according to claim 30, further comprising an auxiliary optical element which is disposed between said light guide element and said projection optical system with an air gap between said auxiliary optical element and said light guide element, and refracts and transmits the image light from said light guide element.

34. The image display optical system according to claim 30, further comprising an auxiliary optical element which is disposed between said light guide element and said illumination optical system with an air gap between said auxiliary optical element and said light guide element, and refracts and transmits the illumination light from said illumination optical system.

35. A projection type image display apparatus comprising:

the image display optical system according to claim 30, wherein original images displayed on said image display elements are enlargedly projected onto said projection surface through said image display optical system.

36. An image display optical system comprising:

an illumination optical system;

a plurality of image display elements, which modulate light incident thereon to emit image light;

a color separation/combination optical system which separates illumination light from said illumination optical system into a plurality of color components of the illumination light to cause the separated light to be incident on said plurality of image display elements and combines the image light emitted from each of said plurality of image display elements;

a projection optical system which projects the image light combined by said color separation/combination optical system onto a projection surface; and a light guide element which is disposed between said illumination optical system and said color separation/combination optical system, reflects the illumination light from said illumination optical system with a reflectivity of substantially 100% to guide the reflected light to said color separation/combination optical system and transmits the image light from said color separation/combination optical system to said projection optical system, wherein each reference axis on the side of the illumination light incident on each of said image display elements and each reference axis on the side of the image light emitted from each of said image display elements are inclined with respect to a normal line of a display surface of each of said image display elements, said reference axis referring to a line obtained by tracing a light ray along a center line of an illumination light flux in said illumination optical system to said light guide element, said color separation/combination optical system, and said projection optical system, at least one of said plurality of image display elements is disposed outside a plane including said reference axis of said illumination optical system and said reference axis of said projection optical system, and said projection optical system is an eccentric optical system.

37. The image display optical system according to claim 36, wherein said projection optical system has at least one rotational asymmetric surface.

38. The image display optical system according to claim 36, wherein said projection optical system has a plurality of optical elements having different rotational symmetry axes.

39. The image display optical system according to claim 36, further comprising an auxiliary optical element which is disposed between said light guide element and said projection optical system with an air gap between said auxiliary optical element and said light guide element, and refracts and transmits the image light from said light guide element.

40. The image display optical system according to claim 36, further comprising an auxiliary optical element which is disposed between said light guide element and said illumination optical system with an air gap between said auxiliary optical element and said light guide element, and refracts and transmits the illumination light from said illumination optical system.

41. A projection type image display apparatus comprising:

the image display optical system according to claim 36, wherein original images displayed on said image display elements are enlargedly projected onto said projection surface through said image display optical system.

42. An image display optical system comprising:

an illumination optical system;

a plurality of image display elements, which modulate light incident thereon to emit image light;

a color separation/combination optical system which separates illumination light from said illumination optical system into a plurality of color components of the illumination light to cause the separated light to be incident on said plurality of image display elements and combines the image light emitted from each of said plurality of image display elements;

a projection optical system which projects the image light combined by said color separation/combination optical system onto a projection surface; and a light guide element which is disposed between said illumination optical system and said color separation/combination optical system, transmits the illumination light from said illumination optical system to said color separation/combination optical system, and reflects the image light from said color separation/combination optical system with a reflectivity of substantially 100% to guide the reflected light to said projection optical system, wherein each optical path of the illumination light and each optical path of the image light are different from each other in said light guide element and said color separation/combination optical system, at least one of said plurality of image display elements is disposed outside a plane including a reference axis of said illumination optical system and a reference axis of said projection optical system, said reference axis referring to a line obtained by tracing a light ray along a center line of an illumination light flux in said illumination optical system to said light guide element, said color separation/combination optical system, and said projection optical system, and said projection optical system is an eccentric optical system.

43. The image display optical system according to claim 42, wherein said projection optical system has at least one rotationally asymmetric surface.

44. The image display optical system according to claim 42, wherein said projection optical system has a plurality of optical elements having different rotational symmetry axes.

45. The image display optical system according to claim 42, further comprising an auxiliary optical element which is disposed between said light guide element and said projection optical system with an air gap between said auxiliary optical element and said light guide element, and refracts and transmits the image light from said light guide element.

46. The image display optical system according to claim 42, further comprising an auxiliary optical element which is disposed between said light guide element and said illumination optical system with an air gap between said auxiliary optical element and said light guide element, and refracts and transmits the illumination light from said illumination optical system.

47. A projection type image display apparatus comprising:

the image display optical system according to claim 42, wherein original images displayed on said image display elements are enlargedly projected onto said projection surface through said image display optical system.

48. An image display optical system comprising:

an illumination optical system;

a plurality of image display elements, which modulate light incident thereon to emit image light;

a color separation/combination optical system which separates illumination light from said illumination optical system into a plurality of color components of the illumination light to cause the separated light to be incident on said plurality of image display elements and combines the image light emitted from each of said plurality of image display elements;

a projection optical system which projects the image light combined by said color separation/combination optical system onto a projection surface; and a light guide element which is disposed between said illumination optical system and said color separation/combination optical system, transmits the illumination light from said illumination optical system to said color separation/combination optical system and reflects the image light from said color separation/combination optical system with a reflectivity of substantially 100% to guide the reflected light to said projection optical system, wherein each reference axis on the side of the illuminationlight incident on each of said image display elements and each reference axis on the side of the image light emitted from each of said image display elements are inclined with respect to a normal line of a display surface of each of said image display elements, said reference axis referring to a line obtained by tracing a light ray along a center line of an illumination light flux in said illumination optical system to said light guide element, said color separation/combination optical system, and said projection optical system, at least one of said plurality of image display elements is disposed outside a plane including said reference axis of said illumination optical system and said reference axis of said projection optical system, and said projection optical system is an eccentric optical system.

49. The image display optical system according to claim 48, wherein said projection optical system has at least one rotationally asymmetric surface.

50. The image display optical system according to claim 48, wherein said projection optical system has a plurality of optical elements having different rotational symmetry axes.

51. The image display optical system according to claim 48, further comprising an auxiliary optical element which is disposed between said light guide element and said projection optical system with an air gap between said auxiliary optical element and said light guide element, and refracts and transmits the image light from said light guide elenient.

52. The image display optical system according to claim 48, further comprising an auxiliary optical element which is disposed between said light guide element and said illumination optical system with an air gap between said auxiliary optical element and said light guide element, and refracts and transmits the illumination light from said illumination optical system.

53. A projection type image display apparatus comprising:

the image display optical system according to claim 48, wherein original images displayed on said image display elements are enlargedly projected onto said projection surface through said image display optical system.

54. An image display optical system comprising:

an illumination optical system;

a plurality of image display elements, which modulate light incident thereon to emit image light;

a color separation/combination optical element which separates illumination light from said illumination optical system into a plurality of color components of the illumination light to cause the separated light to be incident on said plurality of image display elements and combines the image light emitted from each of said plurality of image display elements;

a projection optical system which projects the image light combined by said color separation/combination optical element onto a projection surface; and a light guide element which is disposed between said illumination optical system and said color separation/combination optical element, reflects the illumination light from said illumination optical system with a reflectivity of substantially 100% to guide the reflected light to said color separation/combination optical element and transmits the image light from said color separation/combination optical element to said projection optical system, wherein each optical path of the illumination light and each optical path of the image light are different from each other in said light guide element and said color separation/combination optical element, and an antireflection film is formed on at least one transmission surface through which both the illumination light and the image light pass in at least one of said light guide element and said color separation/combination optical element.

55. The image display optical system according to claim 54, wherein said antireflection film is formed on a glass surface covering a light-receiving area in said image display element.

56. The image display optical system according to claim 54, wherein said antireflection film is formed on said each transmission surface such that a flare ratio F in said illumination optical system is equal to or lower than 1/100, said flare ratio F being represented by:

$$F = \sum_{1}^{n} R_i$$

where n is the number of said at least one transmission surface and Ri(i=1 to n) is the reflectivity at said each transmission surface.

57. The image display optical system according to claim 56, wherein said antireflection film is formed on said each transmission surface such that said flare ratio F in said illumination optical system is equal to or lower than 1/200.

58. The image display optical system according to claim 57, wherein said antireflection film is formed on said each transmission surface such that said flare ratio F in said illumination optical system is equal to or lower than 1/800.

59. The image display optical system according to claim 54, wherein the sum of said flare ratio F in said illumination optical system and said reflectivity Ri(i=1 to n) at said each transmission surface satisfies the following condition:

$$\sum_{1}^{n} R_i < F$$

60. The image display optical system according to claim 54, further comprising an auxiliary optical element which is disposed between said light guide element and said projection optical system with an air gap between said auxiliary optical element and said light guide element, and refracts and transmits the unage light from said light guide element.

61. The image display optical system according to claim 54, further comprising an auxiliary optical element which is disposed between said light guide element and said illumination optical system with an air gap between said auxiliary optical element and said light guide element, and refracts and transmits the illumination light from said illumination optical system.

62. The image display optical system according to claim 54, wherein said projection optical system is an eccentric optical system.

63. A projection type image display apparatus comprising:

the image display optical system according to claim 54, wherein original images displayed on said image display elements are enlargedly projected onto said projection surface through said image display optical system.

64. An image display optical system comprising:

an illumination optical system;

a plurality of image display elements, which modulate light incident thereon to emit image light;

a color separation/combination optical element which separates illumination light from said illumination optical system into a plurality of color components of the illumination light to cause the separated light to be incident on said plurality of image display elements and combines the image light emitted from each of said plurality of image display elements;

a projection optical system which projects the image light combined by said color separation/combination optical element onto a projection surface; and a light guide element which is disposed between said illumination optical system and said color separation/combination optical element, reflects the illumination light from said illumination optical system with a reflectivity of substantially 100% to guide the reflected light to said color separation/combination optical element and transmits the image light from said color separation/combination optical element to said projection optical system, wherein each reference axis on the side of the illumination light incident on each of said image display elements and each reference axis on the side of the image light emitted from each of said image display elements are inclined with respect to a normal line of a display surface of each of said image display elements, said reference axis referring to a line obtainedhy tracing a light ray along a center line of an illumination light flux in said illumination optical system to said light guide element, said color separation/combination optical element, and said projection optical system, and an antireflection film is formed on at least one transmission surface through which both the illumination light and the image light pass in at least one of said light guide element andd said color separation/combination optical element.

65. The image display optical system according to claim 64, wherein said antireflection film is formed on a glass surface covering a light-receiving area in said image display element.

66. The image display optical system according to claim 64, wherein said antireflection film is formed on said each transmission surface such that a flare ratio F in said illumination optical system is equal to or lower than 1/100, said flare ratio F being represented by:

$$F = \sum_{1}^{n} R_i$$

where n is the number of said at least one transmission surface and Ri(i=1 to n) is the reflectivity at said each transmission surface.

67. The image display optical system according to claim 66, wherein said antireflection film is formed on said each transmission surface such that said flare ratio F in said illumination optical system is equal to or lower than 1/200.

68. The image display optical system according to claim 67, wherein said antireflection film is formed on said each transmission surface such that said flare ratio F in said illumination optical system is equal to or lower than 1/800.

69. The image display optical system according to claim 66, wherein the sum of said flare ratio F in said illumination optical system and said reflectivity Ri(i=1 to n) at said each transmission surface satisfies the following condition:

$$\sum_{1}^{n} R_i < F$$

70. The image display optical system according to claim 64, further comprising an auxiliary optical element which is disposed between said light guide element and said projection optical system with an air gap between said auxiliary optical element and said light guide element and refracts and transmits the image light from said light guide element.

71. The image display optical system according to claim 64, further comprising an auxiliary optical element which is disposed between said light guide element and said illumination optical system with an air gap between said auxiliary optical element and said light guide element, and refracts and transmits the illumination light from said illumination optical system.

72. The image display optical system according to claim 64, wherein said projection optical system is an eccentric optical system.

73. A projection type image display apparatus comprising:

the image display optical system according to claim 64, wherein original images displayed on said image display elements are enlargedly projected onto said projection surface through said image display optical system.

74. An image display optical system comprising:

an illumination optical system;

a plurality of image display elements, which modulate light incident thereon to emit image light;

a color separation/combination optical element which separates illumination light from said illumination optical system into a plurality of color components of the illumination light to cause the separated light to be incident on said plurality of image display elements and combines the image light emitted from each of said plurality of image display elements;

a projection optical system which projects the image light combined by said color separation/combination optical element onto a projection surface; and a light guide element which is disposed between said illumination optical system and said color separation/combination optical element, transmits the illumination light from said illumination optical system to said color separation/combination optical element and reflects the image light from said color separation/combination optical element with a reflectivity of substantially 100% to guide the reflected light to said projection optical system, wherein each optical path of the illumination light and each optical path of the image light are different from each other in said light guide element and said color separation/combination optical element, and an antireflection film is formed on at least one transmission surface through which both the illumination light and the image light pass in at least one of said light guide element and said color separation/conibination optical element.

75. The image display optical system according to claim 74, wherein said antireflection film is formed on a glass surface covering a light-receiving area in said image display element.

76. The image display optical system according to claim 74, wherein said anlireflection film is formed on said each transmission surface such that a flare ratio F in said illumination optical system is equal to or lower than 1/100, said flare ratio F being represented by:

$$F = \sum_{1}^{n} R_i$$

where n is the number of said at least one transmission surface and Ri(i=1 to n) is the reflectivity at said each transmission surface.

77. The image display optical system according to claim 76, wherein said anlireflection film is formed on said each transmission surface such that said flare ratio F in said illumination optical system is equal to or lower than 1/200.

78. The image display optical system according to claim 77, wherein said antireflection film is formed on said each transmission surface such that said flare ratio F in said illumination optical system is equal to or lower than 1/800.

79. The image display optical system according to claim 76, wherein the sum of said flare ratio F in said illumination optical system and said reflectivity Ri (i=1 to n) at said each transmission surface satisfies the following condition:

$$\sum_{1}^{n} R_i < F$$

80. The image display optical system according to claim 74, further comprising an auxiliary optical element which is disposed between said light guide element and said projection optical system with an air gap between said auxiliary optical element and said light guide element and refracts and transmits the image light from said light guide element.

81. The image display optical system according to claim 74, further comprising an auxiliary optical element which is disposed between said light guide element and said illumination optical system with an air gap between said auxiliary optical element md said light guide element, and refracts and transmits the illumination light from said illumination optical system.

82. The image display optical system according to claim 74, wherein uid projection optical system is an eccentric optical system.

83. A projection type image display apparatus comprising:

said image display optical system according to claim 74, wherein original images displayed on said image display elements are enlargedly projected onto said projection surface through said image display optical system.

84. An image display optical system comprising:

an illumination optical system;

a plurality of image display elements, which modulate light incident thereon to emit image light;

a color separation/combination optical element which separates illumination light from said illumination optical system into a plurality of color components of the illumination light to cause the separated light to be incident on said plurality of image display elements and combines the image light emitted from each of said plurality of image display elements;

a projection optical system which projects the image light combined by said color separation/combination optical element onto a projection surface; and a light guide element which is disposed between said illumination optical system and said color separation/ combination optical element, transmits the illumination light from said illumination optical system to said color separation/combination optical element and reflects the image light from said color separation/combination optical element with a reflectivity of substantially 100% to guide the reflected light to said projection optical system, wherein each reference axis on the side of the illumination light incident on each of said image display elements and each reference axis on the side of the image light emitted from each of said image display elements are inclined with respect to a normal line of a display surface of each of said image display elements, said reference axis referring to a line obtained by tracing a light ray along a center line of an illumination light flux in said illumination optical system to said light guide element, said color separation/combination optical element, and said projection optical system, and an antireflection film is formed on at least one transmission surface through which both the illumination light and the image light pass in at least one of said light guide element and said color separation/combination optical element.

85. The image display optical system according to claim 84, wherein said antireflection film is formed on a glass surface covering a light-receiving area in said image display element.

86. The image display optical system according to claim 84, wherein said antireflection film is formed on said each transmission surface such that a flare ratio F in said illumination optical system is equal to or lower than 1/100, said flare ratio F being represented by:

$$F = \sum_{1}^{n} R_i$$

where n is the number of said at least one transmission surface and Ri(i=1 to n) is the reflectivity at said each transmission surface.

87. The image display optical system according to claim 86, wherein said antireflection film is formed on said each transmission surface such that said flare ratio F in said illumination optical system is equal to or lower than 1/200.

88. The image display optical system according to claim 87, wherein said antireflection film is formed on said each transmission surface such that said flare ratio F in said illumination optical system is equal to or lower than 1/800.

89. The image display optical system according to claim 86, wherein the sum of said flare ratio F in said illumination optical system and said reflectivity Ri(i=1 to n) at said each transmission surface satisfies the following condition:

$$\sum_{1}^{n} R_i < F$$

90. The image display optical system according to claim 84, further comprising an auxiliary optical element which is disposed between said light guide element said said projection optical system with an air gap between said auxiliary optical element and said light guide element, and refracts and transmits the image light from said light guide element.

91. The image display optical system according to claim 84, further comprising an auxiliary optical element which is disposed between said light guide element and said illumination optical system with an air gap between said auxiliary optical element and said light guide element, and refracts and transmits the illumination light from said illumination optical system.

92. The image display optical system according to claim 84, wherein said projection optical system is an eccentric optical system.

93. A projection type image display apparatus comprising:

said image display optical system according to claim 84, wherein original images displayed on said image display elements are enlargedly projected onto said projection surface through said image display optical system.

* * * * *

UNITED STATES PATENT AND TRADEMARK OFFICE

CERTIFICATE OF CORRECTION

PATENT NO. : 7,222,967 B2
APPLICATION NO. : 10/213719
DATED : May 29, 2007
INVENTOR(S) : Okuyama et al.

It is certified that error appears in the above-identified patent and that said Letters Patent is hereby corrected as shown below:

In the claims:

In claim 1 (col. 34, line 30), please replace “image light” with --image lights--.

In claim 1 (col. 34, line 31), please replace “separationlcombination” with --separation/combination--.

In claim 1 (col. 34, line 32), please replace “separates illumination” with --separates an illumination--.

In claim 1 (col. 34, line 34), please replace “light to cause” with --light, causes--.

In claim 1 (col. 34, line 34), please replace “separated light” with --separated color components--.

In claim 1 (col. 34, line 36), please replace “light emitted” with --lights emitted--.

In claim 1 (col. 34, line 38), please replace “image light” with --image lights--.

In claim 1 (col. 34, line 41), please delete “which is”.

In claim 1 (col. 34, line 43), please replace “system, reflects” with --system, which reflects--.

In claim 1 (col. 34, line 47), please replace “image light” with --image lights--.

In claim 1 (col. 34, line 50), please replace “each” with --an--.

In claim 1 (col. 34, line 51), please replace “mage light” with --image lights--.

UNITED STATES PATENT AND TRADEMARK OFFICE

CERTIFICATE OF CORRECTION

PATENT NO. : 7,222,967 B2
APPLICATION NO. : 10/213719
DATED : May 29, 2007
INVENTOR(S) : Okuyama et al.

It is certified that error appears in the above-identified patent and that said Letters Patent is hereby corrected as shown below:

In the claims:

In claim 1 (col. 34, line 53), please replace “and said” with --and wherein said--.

In claim 4 (col. 34, line 63), please delete “which is”.

In claim 4 (col. 34, line 66), please replace “element, and” with --element, which--.

In claim 4 (col. 34, line 67), please replace “image light” with --image lights--.

In claim 5 (col. 35, line 2), please delete “which is”.

In claim 5 (col. 35, line 5), please replace “element and” with --element, which--.

In claim 7 (col. 35, line 17), please replace “image light” with --image lights--.

In claim 7 (col. 35, line 19), please replace “separates illumination” with --separates an illumination--.

In claim 7 (col. 35, line 21), please replace “light to cause” with --light, causes--.

In claim 7 (col. 35, line 21), please replace “separated light” with --separated color components--.

In claim 7 (col. 35, line 23), please replace “image light” with --image lights--.

In claim 7 (col. 35, line 25), please replace “image light” with --image lights--.

In claim 7 (col. 35, line 28), please delete “which is”.

UNITED STATES PATENT AND TRADEMARK OFFICE

CERTIFICATE OF CORRECTION

PATENT NO. : 7,222,967 B2
APPLICATION NO. : 10/213719
DATED : May 29, 2007
INVENTOR(S) : Okuyama et al.

It is certified that error appears in the above-identified patent and that said Letters Patent is hereby corrected as shown below:

In the claims:

In claim 7 (col. 35, line 30), please replace "system, reflects" with --system, which reflects--.

In claim 7 (col. 35, line 34), please replace "image light" with --image lights--.

In claim 7 (col. 35, line 38), please replace "the side of the side of" with --the side of--

In claim 7 (col. 35, line 41), please replace "image light" with --image lights--.

In claim 7 (col. 35, line 49), please replace "said projection" with --wherein said projection--.

In claim 10 (col. 35, line 58), please delete "which is".

In claim 10 (col. 35, line 61), please replace "and refracts" with --which refracts--.

In claim 10 (col. 35, line 62), please replace "image light" with --image lights--.

In claim 11 (col. 35, line 64), please delete "which is".

In claim 11 (col. 35, line 65), please replace "and refracts" with --which refracts--.

In claim 12 (col. 36, line 9), please replace "image light" with --image lights--.

In claim 14 (col. 36, line 23), please replace "image light" with --image lights--.

In claim 14 (col. 36, line 25), please replace "separates illumination" with --separates an illumination--.

UNITED STATES PATENT AND TRADEMARK OFFICE

CERTIFICATE OF CORRECTION

PATENT NO. : 7,222,967 B2
APPLICATION NO. : 10/213719
DATED : May 29, 2007
INVENTOR(S) : Okuyama et al.

It is certified that error appears in the above-identified patent and that said Letters Patent is hereby corrected as shown below:

In the claims:

In claim 14 (col. 36, line 27), please replace "light to cause" with --light, causes--.

In claim 14 (col. 36, line 27), please replace "separated light" with --separated color components--.

In claim 14 (col. 36, line 29), please replace "image light" with --image lights--.

In claim 14 (col. 36, line 31), please replace "image light" with --image lights--.

In claim 14 (col. 36, line 34), please delete "which is".

In claim 14 (col. 36, line 36), please replace "system, transmits" with --system, which transmits--.

In claim 14 (col. 36, line 39), please replace "image light" with --image lights--.

In claim 14 (col. 36, line 43), please replace "each" with --an--.

In claim 14 (col. 36, line 44), please replace "image light" with --image lights--.

In claim 14 (col. 36, lines 46-47), please replace "said projection" with --wherein said projection--.

In claim 17 (col. 36, line 56), please delete "which is".

In claim 17 (col. 36, line 59), please replace "and refracts" with --which refracts--.

UNITED STATES PATENT AND TRADEMARK OFFICE

CERTIFICATE OF CORRECTION

PATENT NO. : 7,222,967 B2
APPLICATION NO. : 10/213719
DATED : May 29, 2007
INVENTOR(S) : Okuyama et al.

It is certified that error appears in the above-identified patent and that said Letters Patent is hereby corrected as shown below:

In the claims:

In claim 17 (col. 36, line 60), please replace “image light” with --image lights--.

In claim 18 (col. 36, line 62), please delete “which is”.

In claim 18 (col. 36, line 65), please replace “and refracts” with --which refracts--.

In claim 20 (col. 37, line 10), please replace “image light” with --image lights--.

In claim 20 (col. 37, line 12), please replace “separates illumination” with --separates an illumination--.

In claim 20 (col. 37, line 14), please replace “light to cause” with --light, causes--.

In claim 20 (col. 37, line 14), please replace “separated light” with --separated color components--.

In claim 20 (col. 37, line 16), please replace “image light” with --image lights--.

In claim 20 (col. 37, line 18), please replace “image light” with --image lights--.

In claim 20 (col. 37, line 21), please delete “which is”.

In claim 20 (col. 37, line 23), please replace “system, transmits” with --system, which transmits--.

In claim 20 (col. 37, line 26), please replace “image light” with --image lights--.

UNITED STATES PATENT AND TRADEMARK OFFICE

CERTIFICATE OF CORRECTION

PATENT NO. : 7,222,967 B2
APPLICATION NO. : 10/213719
DATED : May 29, 2007
INVENTOR(S) : Okuyama et al.

It is certified that error appears in the above-identified patent and that said Letters Patent is hereby corrected as shown below:

In the claims:

In claim 20 (col. 37, line 32), please replace “image light” with --image lights--.

In claim 20 (col. 37, line 40), please replace “projection optical system, and said” with --projection optical system, and wherein said--.

In claim 23 (col. 37, line 49), please delete “which is”.

In claim 23 (col. 37, line 52), please replace “and refracts” with --which refracts--.

In claim 23 (col. 37, line 53), please replace “image light” with --image lights--.

In claim 24 (col. 37, line 55), please delete “which is”.

In claim 24 (col. 37, line 58), please replace “and refracts” with --which refracts--.

In claim 25 (col. 38, line 1), please replace “image light” with --image lights--.

In claim 27 (col. 38, line 17), please replace “image light” with --image lights--.

In claim 27 (col. 38, line 26), please replace “image light” with --image lights--.

In claim 28 (col. 38, line 44), please replace “light to cause” with --light, causes--.

In claim 28 (col. 38, line 44), please replace “separated light” with --separated color components--.

In claim 28 (col. 38, line 46), please replace “image light” with --image lights--.

In claim 30 (col. 38, line 59), please replace “image light” with --image lights--.

UNITED STATES PATENT AND TRADEMARK OFFICE

CERTIFICATE OF CORRECTION

PATENT NO. : 7,222,967 B2
APPLICATION NO. : 10/213719
DATED : May 29, 2007
INVENTOR(S) : Okuyama et al.

It is certified that error appears in the above-identified patent and that said Letters Patent is hereby corrected as shown below:

In the claims:

In claim 30 (col. 38, line 61), please replace “separates illumination” with --separates an illumination--.

In claim 30 (col. 38, line 63), please replace “light to cause” with --light, causes--.

In claim 30 (col. 38, line 63), please replace “separated light” with --separated color components--.

In claim 30 (col. 39, line 1), please replace “image light” with --image lights--.

In claim 30 (col. 39, line 4), please delete “which is”.

In claim 30 (col. 39, line 6), please replace “systems, reflects” with --system, which reflects--.

In claim 30 (col. 39, line 10), please replace “image light” with --image lights--.
In claim 30 (col. 39, line 12), please replace “each” with --an--.

In claim 30 (col. 39, lines 13-14), please replace “image light” with --image lights--.

In claim 30 (col. 39, line 17), please replace “at least” with --wherein at least--.

In claim 30 (col. 39, line 25), please replace “and said projection” with --and wherein said projection--.

In claim 33 (col. 39, line 34), please delete “which is”.

In claim 33 (col. 39, line 37), please replace “and refracts” with --which refracts--.

In claim 33 (col. 39, line 38), please replace “image light” with --image lights--.

UNITED STATES PATENT AND TRADEMARK OFFICE

CERTIFICATE OF CORRECTION

PATENT NO. : 7,222,967 B2 
APPLICATION NO. : 10/213719
DATED : May 29, 2007
INVENTOR(S) : Okuyama et al.

It is certified that error appears in the above-identified patent and that said Letters Patent is hereby corrected as shown below:

In the claims:

In claim 34 (col. 39, line 40), please delete “which is”.

In claim 34 (col. 39, line 43), please replace “and refracts” with --which refracts--.

In claim 36 (col. 39, line 55), please replace “image light” with --image lights--.

In claim 36 (col. 39, line 57), please replace “separates illumination” with --separates an illumination--.

In claim 36 (col. 39, line 59), please replace “light to cause” with --light, causes--.

In claim 36 (col. 39, line 59), please replace “separated light” with --separated color components--.

In claim 36 (col. 39, line 61), please replace “image light” with --image lights--.

In claim 36 (col. 39, line 66), please delete “which is”.

In claim 36 (col. 40, line 1), please replace “system, reflects” with --system, which reflects--.

In claim 36 (col. 40, line 5), please replace “image light” with --image lights--.

In claim 36 (col. 40, line 10), please replace “image light” with --image lights--.

In claim 36 (col. 40, line 19), please replace “at least” with --wherein at least--.

In claim 36 (col. 40, line 22), please replace “and said projection” with --and wherein said projection--.

In claim 39 (col. 40, line 31), please delete “which is”.

In claim 39 (col. 40, line 34), please replace “and refracts” with --which refracts--.

UNITED STATES PATENT AND TRADEMARK OFFICE

CERTIFICATE OF CORRECTION

PATENT NO. : 7,222,967 B2
APPLICATION NO. : 10/213719
DATED : May 29, 2007
INVENTOR(S) : Okuyama et al.

It is certified that error appears in the above-identified patent and that said Letters Patent is hereby corrected as shown below:

In the claims:

In claim 39 (col. 40, line 35), please replace “image light” with --image lights--.

In claim 40 (col. 40, line 37), please delete “which is”.

In claim 40 (col. 40, line 40), please replace “and refracts” with --which refracts--.

In claim 42 (col. 40, line 52), please replace “image light” with --image lights--.

In claim 42 (col. 40, line 54), please replace “separates illumination” with --separates an illumination--.

In claim 42 (col. 40, line 56), please replace “light to cause” with --light, causes--.

In claim 42 (col. 40, line 58), please replace “separated light” with --separated color components--.

In claim 42 (col. 40, line 60), please replace “image light” with --image lights--.

In claim 42 (col. 40, line 63), please delete “which is”.

In claim 42 (col. 41, line 1), please replace “system, reflects” with --system, which reflects--.

In claim 42 (col. 41, line 2), please replace “image light” with --image lights--.

In claim 42, (col. 41, line 6), please replace “each” with --an--.

In claim 42 (col. 41, line 7), please replace “image light” with image lights--.

In claim 42 (col. 41, line 10), please replace “at least” with --wherein at least--.

In claim 42 (col. 41, line 18), please replace “and said projection” with --and wherein said projection--.

UNITED STATES PATENT AND TRADEMARK OFFICE

CERTIFICATE OF CORRECTION

PATENT NO. : 7,222,967 B2
APPLICATION NO. : 10/213719
DATED : May 29, 2007
INVENTOR(S) : Okuyama et al.

It is certified that error appears in the above-identified patent and that said Letters Patent is hereby corrected as shown below:

<u>In the claims:</u>

In claim 45 (col. 41, line 26), please delete “which is”.

In claim 45 (col. 41, line 29), please replace “and refracts” with --which refracts--.

In claim 45 (col. 41, line 30), please replace “image light” with --image lights--.

In claim 46 (col. 41, line 32), please delete “which is”.

In claim 46 (col. 41, line 35), please replace “and refracts” with --which refracts--.

In claim 48 (col. 41, line 47), please replace “image light” with --image lights--.

In claim 48 (col. 41, line 49), please replace “separates illumination” with --separates an illumination--.

In claim 48 (col. 41, line 51), please replace “light to cause” with --light, causes--.

In claim 48 (col. 41, line 51), please replace “separated light” with --separated color components--.

In claim 48 (col. 41, line 53), please replace “image light” with --image lights--.

In claim 48 (col. 41, line 58), please delete “which is”.

In claim 48 (col. 41, line 62), please replace “system, reflects” with --system, which reflects--.

In claim 48 (col. 41, line 63), please replace “image light” with --image lights--.

In claim 48, (col. 42, lines 3-4), please replace “image light” with --image lights--.

UNITED STATES PATENT AND TRADEMARK OFFICE
CERTIFICATE OF CORRECTION

PATENT NO. : 7,222,967 B2
APPLICATION NO. : 10/213719
DATED : May 29, 2007
INVENTOR(S) : Okuyama et al.

It is certified that error appears in the above-identified patent and that said Letters Patent is hereby corrected as shown below:

In the claims:

In claim 48 (col. 42, line 12), please replace “at least” with --wherein at least--.

In claim 48 (col. 42, line 15), please replace “and said projection” with --and wherein said projection--.

In claim 51 (col. 42, line 24), please delete “which is”.

In claim 51 (col. 42, line 27), please replace “and refracts” with --which refracts--.

In claim 51 (col. 42, line 28), please replace “image light” with --image lights--.

In claim 52 (col. 42, line 30), please delete “which is”.

In claim 52 (col. 42, line 33), please replace “and refracts” with --which refracts--.

In claim 54 (col. 42, line 47), please replace “image light” with --image lights--.

In claim 54 (col. 42, line 49), please replace “separates illumination” with --separates an illumination--.

In claim 54 (col. 42, line 51), please replace “light to cause” with --light, causes--.

In claim 54 (col. 42, line 51), please replace “separated light” with --separated color components--.

In claim 54 (col. 42, line 53), please replace “image light” with --image lights--.

In claim 54 (col. 42, line 55), please replace “image light” with --image lights--.

In claim 54 (col. 42, line 58), please delete “which is”.

UNITED STATES PATENT AND TRADEMARK OFFICE

CERTIFICATE OF CORRECTION

PATENT NO. : 7,222,967 B2
APPLICATION NO. : 10/213719
DATED : May 29, 2007
INVENTOR(S) : Okuyama et al.

It is certified that error appears in the above-identified patent and that said Letters Patent is hereby corrected as shown below:

In the claims:

In claim 54 (col. 42, line 60), please replace “system, reflects” with --system, which reflects--.

In claim 54 (col. 42, line 64), please replace “image light” with --image lights--.

In claim 54 (col. 43, line 1), please replace “each” with --an--.

In claim 54 (col. 43, line 2), please replace “image light” with --image lights--.

In claim 54 (col. 43, line 5), please replace “an antireflection” with --wherein an antireflection--.

In claim 54 (col. 43, line 7), please replace “image light” with --image lights--.

In claim 60 (col. 43, line 43), please delete “which is”.

In claim 60 (col. 43, line 46), please replace “and refracts” with --which refracts--.

In claim 60 (col. 43, line 47), please replace “unage light” with --image lights--.

In claim 61 (col. 43, line 49), please delete “which is”.

In claim 61 (col. 43, line 52), please replace “and refracts” with --which refracts--.

In claim 64 (col. 43, line 66), please replace “image light” with --image lights--.

In claim 64 (col. 44, line 2), please replace “separates illumination” with --separates an illumination--.

In claim 64 (col. 44, line 4), please replace “light to cause” with --light, causes--.

In claim 64 (col. 44, line 4), please replace “separated light” with --separated color components--.

UNITED STATES PATENT AND TRADEMARK OFFICE

CERTIFICATE OF CORRECTION

PATENT NO. : 7,222,967 B2
APPLICATION NO. : 10/213719
DATED : May 29, 2007
INVENTOR(S) : Okuyama et al.

It is certified that error appears in the above-identified patent and that said Letters Patent is hereby corrected as shown below:

In the claims:

In claim 64 (col. 44, line 6), please replace “image light” with --image lights--.

In claim 64 (col. 44, line 8), please replace “image light” with --image lights--.

In claim 64 (col. 44, line 11), please delete “which is”.

In claim 64 (col. 44, line 13), please replace “element, reflects” with --element, which reflects--.

In claim 64 (col. 44, line 17), please replace “image light” with --image lights--.

In claim 64 (col. 44, line 22), please replace “image light” with --image lights--.

In claim 64 (col. 44, line 34), please replace “an antireflection” with --wherein an antireflection--.

In claim 64 (col. 44, line 36), please replace “image light” with --image lights--.

In claim 70 (col. 45, line 8), please delete “which is”.

In claim 70 (col. 45, line 11), please replace “element and refracts” with --element, which refracts--.

In claim 70 (col. 45, line 12), please replace “image light” with --image lights--.

In claim 71 (col. 45, line 14), please delete “which is”.

In claim 71 (col. 45, line 17), please replace “and refracts” with --which refracts--.

In claim 74 (col. 45, line 32), please replace “image light” with --image lights--.

In claim 74 (col. 45, line 34), please replace “separates illumination” with --separates an illumination--.

UNITED STATES PATENT AND TRADEMARK OFFICE

CERTIFICATE OF CORRECTION

PATENT NO. : 7,222,967 B2
APPLICATION NO. : 10/213719
DATED : May 29, 2007
INVENTOR(S) : Okuyama et al.

It is certified that error appears in the above-identified patent and that said Letters Patent is hereby corrected as shown below:

In the claims:

In claim 74 (col. 45, line 36), please replace “light to cause” with --light, causes--.

In claim 74 (col. 45, line 36), please replace “separated light” with --separated color components--.

In claim 74 (col. 45, line 38), please replace “image light” with --image lights--.

In claim 74 (col. 45, line 40), please replace “image light” with --image lights--.

In claim 74 (col. 45, line 43), please delete “which is”.

In claim 74 (col. 45, line 47), please replace “element, reflects” with --element, which reflects--.

In claim 74 (col. 45, line 48), please replace “image light” with --image lights--.

In claim 74 (col. 45, line 52), please replace “each” with --an--.

In claim 74 (col. 45, line 53), please replace “image light” with --image lights--.

In claim 74 (col. 45, line 56), please replace “an antireflection” with --wherein an antireflection--.

In claim 74 (col. 45, line 58), please replace “image light” with --image lights--.

In claim 80 (col. 46, line 30), please delete “which is”.

In claim 80 (col. 46, line 33), please replace “element and refracts” with --element, which refracts--.

In claim 80 (col. 46, line 34), please replace “image light” with --image lights--.

In claim 81 (col. 46, line 36), please delete “which is”.

UNITED STATES PATENT AND TRADEMARK OFFICE
CERTIFICATE OF CORRECTION

PATENT NO. : 7,222,967 B2
APPLICATION NO. : 10/213719
DATED : May 29, 2007
INVENTOR(S) : Okuyama et al.

It is certified that error appears in the above-identified patent and that said Letters Patent is hereby corrected as shown below:

In the claims;

In claim 81 (col. 46, line 39), please replace “and refracts” with --which refracts--.

In claim 84 (col. 46, line 54), please replace “image light” with --image lights--.

In claim 84 (col. 46, line 56), please replace “separates illumination” with --separates an illumination--.

In claim 84 (col. 46, line 58), please replace “light to cause” with --light, causes--.

In claim 84 (col. 46, line 58), please replace “separated light” with --separated color components--.

In claim 84 (col. 46, line 60), please replace “image light” with --image lights--.

In claim 84 (col. 46, line 62), please replace “image light” with --image lights--.

In claim 84 (col. 46, line 65), please delete “which is”.

In claim 84 (col. 47, line 3), please replace “element, reflects” with --element, which reflects--.

In claim 84 (col. 47, line 4), please replace “image light” with --image lights--.

In claim 84 (col. 47, line 10), please replace “image light” with --image lights--.

In claim 84 (col. 47, line 19), please replace “an antireflection” with --wherein an antireflection--.

In claim 84 (col. 47, line 21), please replace “image light” with --image lights--.

UNITED STATES PATENT AND TRADEMARK OFFICE

CERTIFICATE OF CORRECTION

PATENT NO. : 7,222,967 B2
APPLICATION NO. : 10/213719
DATED : May 29, 2007
INVENTOR(S) : Okuyama et al.

It is certified that error appears in the above-identified patent and that said Letters Patent is hereby corrected as shown below:

In the claims:

In claim 90 (col. 48, line 18), please delete "which is".

In claim 90 (col. 48, line 21), please replace "element and refracts" with --element, which refracts--.

In claim 90 (col. 48, line 22), please replace "image light" with --image lights--.

In claim 91 (col. 48, line 24), please delete "which is".

In claim 91 (col. 48, line 27), please replace "and refracts" with --which refracts--.

Signed and Sealed this

First Day of April, 2008

JON W. DUDAS
*Director of the United States Patent and Trademark Office*